US010222889B2

(12) United States Patent
Picciotto et al.

(10) Patent No.: US 10,222,889 B2
(45) Date of Patent: Mar. 5, 2019

(54) FORCE INPUTS AND CURSOR CONTROL

(71) Applicant: Microsoft Technology Licensing, LLC, Redmond, WA (US)

(72) Inventors: Carl E. Picciotto, Clyde Hill, WA (US); Robbie Edgar, Sammamish, WA (US); James C. Marshall, Puyallup, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 14/729,887

(22) Filed: Jun. 3, 2015

(65) Prior Publication Data
US 2016/0357297 A1 Dec. 8, 2016

(51) Int. Cl.
G06F 3/041 (2006.01)
G06F 3/044 (2006.01)
G06F 3/0488 (2013.01)
G06F 3/038 (2013.01)

(52) U.S. Cl.
CPC ............ *G06F 3/0414* (2013.01); *G06F 3/038* (2013.01); *G06F 3/044* (2013.01); *G06F 3/0416* (2013.01); *G06F 3/0488* (2013.01); *G06F 2203/04105* (2013.01)

(58) Field of Classification Search
CPC ................... G06F 3/0414; G06F 3/044; G06F 2203/04105
See application file for complete search history.

(56) References Cited

U.S. PATENT DOCUMENTS

| 578,325 | A | 3/1897 | Fleming |
| 4,046,975 | A | 9/1977 | Seeger, Jr. |
| 4,065,649 | A | 12/1977 | Carter et al. |
| 4,243,861 | A | 1/1981 | Strandwitz |
| 4,279,021 | A | 7/1981 | See et al. |
| 4,302,648 | A | 11/1981 | Sado et al. |
| 4,317,013 | A | 2/1982 | Larson |

(Continued)

FOREIGN PATENT DOCUMENTS

| EP | 1223722 | 7/2002 |
| EP | 1591891 | 11/2005 |

(Continued)

OTHER PUBLICATIONS

"International Search Report and Written Opinion", Application No. PCT/US2016/028191, dated Jun. 29, 2016, 14 pages.

(Continued)

*Primary Examiner* — Xuemei Zheng

(57) ABSTRACT

Inadvertent input control techniques are described. In one or more implementations, techniques are described that leverage force to determine a likelihood that a user intended to provide an input, e.g., a selection input (e.g., a "click"), gesture, lift off, and so forth. This is usable to identify taps, hovers, continuation of movement of a drag operation, and so on. Implementations are also discussed that leverage an n-manifold in the product space of contact size and signal strength that is usable to define a likelihood of whether a contact includes an application of force. A variety of other examples are also described, including cursor stability techniques that leverage force in order to control movement of a cursor.

20 Claims, 15 Drawing Sheets

(56) References Cited

U.S. PATENT DOCUMENTS

| | | | |
|---|---|---|---|
| 4,326,193 A | 4/1982 | Markley et al. |
| 4,365,130 A | 12/1982 | Christensen |
| 4,492,829 A | 1/1985 | Rodrique |
| 4,527,021 A | 7/1985 | Morikawa et al. |
| 4,559,426 A | 12/1985 | Van Zeeland et al. |
| 4,577,822 A | 3/1986 | Wilkerson |
| 4,588,187 A | 5/1986 | Dell |
| 4,607,147 A | 8/1986 | Ono et al. |
| 4,651,133 A | 3/1987 | Ganesan et al. |
| 4,735,394 A | 4/1988 | Facco |
| 4,890,832 A | 1/1990 | Komaki |
| 5,220,521 A | 6/1993 | Kikinis |
| 5,283,559 A | 2/1994 | Kalendra et al. |
| 5,331,443 A | 7/1994 | Stanisci |
| 5,480,118 A | 1/1996 | Cross |
| 5,489,900 A | 2/1996 | Cali et al. |
| 5,510,783 A | 4/1996 | Findlater et al. |
| 5,546,271 A | 8/1996 | Gut et al. |
| 5,548,477 A | 8/1996 | Kumar et al. |
| 5,558,577 A | 9/1996 | Kato |
| 5,576,981 A | 11/1996 | Parker et al. |
| 5,612,719 A | 3/1997 | Beernink et al. |
| 5,618,232 A | 4/1997 | Martin |
| 5,681,220 A | 10/1997 | Bertram et al. |
| 5,745,376 A | 4/1998 | Barker et al. |
| 5,748,114 A | 5/1998 | Koehn |
| 5,781,406 A | 7/1998 | Hunte |
| 5,807,175 A | 9/1998 | Davis et al. |
| 5,818,361 A | 10/1998 | Acevedo |
| 5,828,770 A | 10/1998 | Leis et al. |
| 5,842,027 A | 11/1998 | Oprescu et al. |
| 5,859,642 A | 1/1999 | Jones |
| 5,874,697 A | 2/1999 | Selker et al. |
| 5,909,211 A | 6/1999 | Combs et al. |
| 5,912,659 A * | 6/1999 | Rutledge ............. G06F 3/0338 345/156 |
| 5,926,170 A | 7/1999 | Oba |
| 5,942,733 A | 8/1999 | Allen et al. |
| 5,971,635 A | 10/1999 | Wise |
| 6,002,389 A | 12/1999 | Kasser |
| 6,005,209 A | 12/1999 | Burleson et al. |
| 6,012,714 A | 1/2000 | Worley et al. |
| 6,040,823 A | 3/2000 | Seffernick et al. |
| 6,044,717 A | 4/2000 | Biegelsen et al. |
| 6,061,644 A | 5/2000 | Leis |
| 6,112,797 A | 9/2000 | Colson et al. |
| 6,147,859 A | 11/2000 | Abboud |
| 6,177,926 B1 | 1/2001 | Kunert |
| 6,178,443 B1 | 1/2001 | Lin |
| 6,239,786 B1 | 5/2001 | Burry et al. |
| 6,254,105 B1 | 7/2001 | Rinde et al. |
| 6,279,060 B1 | 8/2001 | Luke et al. |
| 6,329,617 B1 | 12/2001 | Burgess |
| 6,344,791 B1 | 2/2002 | Armstrong |
| 6,380,497 B1 | 4/2002 | Hashimoto et al. |
| 6,429,846 B2 | 8/2002 | Rosenberg et al. |
| 6,437,682 B1 | 8/2002 | Vance |
| 6,506,983 B1 | 1/2003 | Babb et al. |
| 6,511,378 B1 | 1/2003 | Bhatt et al. |
| 6,532,147 B1 | 3/2003 | Christ, Jr. |
| 6,543,949 B1 | 4/2003 | Ritchey et al. |
| 6,565,439 B2 | 5/2003 | Shinohara et al. |
| 6,597,347 B1 | 7/2003 | Yasutake |
| 6,600,121 B1 | 7/2003 | Olodort et al. |
| 6,603,408 B1 | 8/2003 | Gaba |
| 6,617,536 B2 | 9/2003 | Kawaguchi |
| 6,651,943 B2 | 11/2003 | Cho et al. |
| 6,685,369 B2 | 2/2004 | Lien |
| 6,695,273 B2 | 2/2004 | Iguchi |
| 6,704,864 B1 | 3/2004 | Philyaw |
| 6,721,019 B2 | 4/2004 | Kono et al. |
| 6,725,318 B1 | 4/2004 | Sherman et al. |
| 6,738,049 B2 | 5/2004 | Kiser et al. |
| 6,758,615 B2 | 7/2004 | Monney et al. |
| 6,774,888 B1 | 8/2004 | Genduso |
| 6,776,546 B2 | 8/2004 | Kraus et al. |
| 6,781,819 B2 | 8/2004 | Yang et al. |
| 6,784,869 B1 | 8/2004 | Clark et al. |
| 6,813,143 B2 | 11/2004 | Makela |
| 6,819,316 B2 | 11/2004 | Schulz et al. |
| 6,856,506 B2 | 2/2005 | Doherty et al. |
| 6,861,961 B2 | 3/2005 | Sandbach et al. |
| 6,864,573 B2 | 3/2005 | Robertson et al. |
| 6,898,315 B2 | 5/2005 | Guha |
| 6,914,197 B2 | 7/2005 | Doherty et al. |
| 6,950,950 B2 | 9/2005 | Sawyers et al. |
| 6,970,957 B1 | 11/2005 | Oshins et al. |
| 6,975,302 B1 | 12/2005 | Ausbeck et al. |
| 6,976,799 B2 | 12/2005 | Kim et al. |
| 7,051,149 B2 | 5/2006 | Wang et al. |
| 7,083,295 B1 | 8/2006 | Hanna |
| 7,091,436 B2 | 8/2006 | Serban |
| 7,091,955 B2 | 8/2006 | Kramer |
| 7,095,404 B2 | 8/2006 | Vincent et al. |
| 7,106,222 B2 | 9/2006 | Ward et al. |
| 7,116,309 B1 | 10/2006 | Kimura et al. |
| 7,123,292 B1 | 10/2006 | Seeger et al. |
| 7,194,662 B2 | 3/2007 | Do et al. |
| 7,202,837 B2 | 4/2007 | Ihara |
| 7,213,991 B2 | 5/2007 | Chapman et al. |
| 7,224,830 B2 | 5/2007 | Nefian et al. |
| 7,245,292 B1 | 7/2007 | Custy |
| 7,277,087 B2 | 10/2007 | Hill et al. |
| 7,301,759 B2 | 11/2007 | Hsiung |
| 7,374,312 B2 | 5/2008 | Feng et al. |
| 7,401,992 B1 | 7/2008 | Lin |
| 7,423,557 B2 | 9/2008 | Kang |
| 7,446,276 B2 | 11/2008 | Plesko et al. |
| 7,447,934 B2 | 11/2008 | Dasari et al. |
| 7,469,386 B2 | 12/2008 | Bear et al. |
| 7,486,165 B2 | 2/2009 | Ligtenberg et al. |
| 7,499,037 B2 | 3/2009 | Lube |
| 7,502,803 B2 | 3/2009 | Culter et al. |
| 7,542,052 B2 | 6/2009 | Solomon et al. |
| 7,557,312 B2 | 7/2009 | Clark et al. |
| 7,558,594 B2 | 7/2009 | Wilson |
| 7,559,834 B1 | 7/2009 | York |
| RE40,891 E | 9/2009 | Yasutake |
| 7,602,384 B2 | 10/2009 | Rosenberg et al. |
| 7,620,244 B1 | 11/2009 | Collier |
| 7,622,907 B2 | 11/2009 | Vranish |
| 7,636,921 B2 | 12/2009 | Louie |
| 7,639,876 B2 | 12/2009 | Clary et al. |
| 7,656,392 B2 | 2/2010 | Bolender |
| 7,686,694 B2 | 3/2010 | Cole |
| 7,728,820 B2 | 6/2010 | Rosenberg et al. |
| 7,728,923 B2 | 6/2010 | Kim et al. |
| 7,731,147 B2 | 6/2010 | Rha |
| 7,733,326 B1 | 6/2010 | Adiseshan |
| 7,736,042 B2 | 6/2010 | Park et al. |
| 7,773,076 B2 | 8/2010 | Pittel et al. |
| 7,773,121 B1 | 8/2010 | Huntsberger et al. |
| 7,774,155 B2 | 8/2010 | Sato et al. |
| 7,777,972 B1 | 8/2010 | Chen et al. |
| 7,782,342 B2 | 8/2010 | Koh |
| 7,813,715 B2 | 10/2010 | McKillop et al. |
| 7,815,358 B2 | 10/2010 | Inditsky |
| 7,817,428 B2 | 10/2010 | Greer, Jr. et al. |
| 7,865,639 B2 | 1/2011 | McCoy et al. |
| 7,884,807 B2 | 2/2011 | Hovden et al. |
| 7,907,394 B2 | 3/2011 | Richardson et al. |
| D636,397 S | 4/2011 | Green |
| 7,928,964 B2 | 4/2011 | Kolmykov-Zotov et al. |
| 7,936,501 B2 | 5/2011 | Smith et al. |
| 7,945,717 B2 | 5/2011 | Rivalsi |
| 7,952,566 B2 | 5/2011 | Poupyrev et al. |
| 7,970,246 B2 | 6/2011 | Travis et al. |
| 7,973,771 B2 | 7/2011 | Geaghan |
| 7,976,393 B2 | 7/2011 | Haga et al. |
| 7,978,281 B2 | 7/2011 | Vergith et al. |
| 8,016,255 B2 | 9/2011 | Lin |
| 8,018,386 B2 | 9/2011 | Qi et al. |
| 8,018,579 B1 | 9/2011 | Krah |
| 8,022,939 B2 | 9/2011 | Hinata |

(56) References Cited

U.S. PATENT DOCUMENTS

| | | |
|---|---|---|
| 8,026,904 B2 | 9/2011 | Westerman |
| 8,053,688 B2 | 11/2011 | Conzola et al. |
| 8,063,886 B2 | 11/2011 | Serban et al. |
| 8,065,624 B2 | 11/2011 | Morin et al. |
| 8,069,356 B2 | 11/2011 | Rathi et al. |
| 8,077,160 B2 | 12/2011 | Land et al. |
| 8,090,885 B2 | 1/2012 | Callaghan et al. |
| 8,094,134 B2 | 1/2012 | Suzuki et al. |
| 8,098,233 B2 | 1/2012 | Hotelling et al. |
| 8,115,499 B2 | 2/2012 | Osoinach et al. |
| 8,117,362 B2 | 2/2012 | Rodriguez et al. |
| 8,118,274 B2 | 2/2012 | McClure et al. |
| 8,118,681 B2 | 2/2012 | Mattice et al. |
| 8,130,203 B2 | 3/2012 | Westerman |
| 8,154,524 B2 | 4/2012 | Wilson et al. |
| 8,162,282 B2 | 4/2012 | Hu et al. |
| D659,139 S | 5/2012 | Gengler |
| 8,169,421 B2 | 5/2012 | Wright et al. |
| 8,189,973 B2 | 5/2012 | Travis et al. |
| 8,216,074 B2 | 7/2012 | Sakuma |
| 8,229,509 B2 | 7/2012 | Paek et al. |
| 8,229,522 B2 | 7/2012 | Kim et al. |
| 8,232,963 B2 | 7/2012 | Orsley et al. |
| 8,267,368 B2 | 9/2012 | Torii et al. |
| 8,269,093 B2 | 9/2012 | Naik et al. |
| 8,274,784 B2 | 9/2012 | Franz et al. |
| 8,279,589 B2 | 10/2012 | Kim |
| 8,279,623 B2 | 10/2012 | Idzik et al. |
| 8,322,290 B1 | 12/2012 | Mignano |
| 8,330,061 B2 | 12/2012 | Rothkopf et al. |
| 8,330,742 B2 | 12/2012 | Reynolds et al. |
| 8,378,972 B2 | 2/2013 | Pance et al. |
| 8,403,576 B2 | 3/2013 | Merz |
| 8,416,559 B2 | 4/2013 | Agata et al. |
| 8,487,751 B2 | 7/2013 | Laitinen et al. |
| 8,498,100 B1 | 7/2013 | Whitt, III et al. |
| 8,570,297 B2 * | 10/2013 | Bulea .................. G06F 3/0416 345/156 |
| 8,607,651 B2 | 12/2013 | Eventoff |
| 8,633,916 B2 | 1/2014 | Bernstein et al. |
| 8,638,315 B2 | 1/2014 | Algreatly |
| 8,659,555 B2 | 2/2014 | Pihlaja |
| 8,674,961 B2 | 3/2014 | Posamentier |
| 8,757,374 B1 | 6/2014 | Kaiser |
| 8,766,925 B2 | 7/2014 | Perlin et al. |
| 8,836,664 B2 | 9/2014 | Colgate et al. |
| 8,847,895 B2 | 9/2014 | Lim et al. |
| 8,854,331 B2 | 10/2014 | Heubel et al. |
| 8,928,581 B2 | 1/2015 | Braun et al. |
| 8,970,525 B1 | 3/2015 | D Los Reyes |
| 9,047,012 B1 | 6/2015 | Bringert et al. |
| 9,448,631 B2 | 9/2016 | Winter et al. |
| 9,459,160 B2 | 10/2016 | Shaw et al. |
| 2001/0035859 A1 | 11/2001 | Kiser |
| 2002/0000977 A1 | 1/2002 | Vranish |
| 2002/0126445 A1 | 9/2002 | Minaguchi et al. |
| 2002/0134828 A1 | 9/2002 | Sandbach et al. |
| 2002/0154099 A1 | 10/2002 | Oh |
| 2002/0188721 A1 | 12/2002 | Lemel et al. |
| 2003/0016282 A1 | 1/2003 | Koizumi |
| 2003/0044215 A1 | 3/2003 | Monney et al. |
| 2003/0063073 A1 | 4/2003 | Geaghan et al. |
| 2003/0083131 A1 | 5/2003 | Armstrong |
| 2003/0107557 A1 | 6/2003 | Liebenow et al. |
| 2003/0132916 A1 | 7/2003 | Kramer |
| 2003/0163611 A1 | 8/2003 | Nagao |
| 2003/0197687 A1 | 10/2003 | Shetter |
| 2003/0201982 A1 | 10/2003 | Iesaka |
| 2003/0206162 A1 | 11/2003 | Roberts |
| 2004/0005184 A1 | 1/2004 | Kim et al. |
| 2004/0100457 A1 | 5/2004 | Mandle |
| 2004/0174670 A1 | 9/2004 | Huang et al. |
| 2004/0190239 A1 | 9/2004 | Weng et al. |
| 2004/0212598 A1 | 10/2004 | Kraus et al. |
| 2004/0227721 A1 | 11/2004 | Moilanen et al. |
| 2004/0258924 A1 | 12/2004 | Berger et al. |
| 2004/0268000 A1 | 12/2004 | Barker et al. |
| 2005/0030728 A1 | 2/2005 | Kawashima et al. |
| 2005/0057515 A1 | 3/2005 | Bathiche |
| 2005/0057521 A1 | 3/2005 | Aull et al. |
| 2005/0059441 A1 | 3/2005 | Miyashita |
| 2005/0059489 A1 | 3/2005 | Kim |
| 2005/0146512 A1 | 7/2005 | Hill et al. |
| 2005/0190159 A1 | 9/2005 | Skarine |
| 2005/0240949 A1 | 10/2005 | Liu et al. |
| 2005/0264653 A1 | 12/2005 | Starkweather et al. |
| 2005/0264988 A1 | 12/2005 | Nicolosi |
| 2005/0285703 A1 | 12/2005 | Wheeler et al. |
| 2006/0028095 A1 | 2/2006 | Maruyama et al. |
| 2006/0049993 A1 | 3/2006 | Lin et al. |
| 2006/0063073 A1 | 3/2006 | Kawashima et al. |
| 2006/0082973 A1 | 4/2006 | Egbert et al. |
| 2006/0085658 A1 | 4/2006 | Allen et al. |
| 2006/0102914 A1 | 5/2006 | Smits et al. |
| 2006/0103633 A1 | 5/2006 | Gioeli |
| 2006/0125799 A1 | 6/2006 | Hillis et al. |
| 2006/0132423 A1 | 6/2006 | Travis |
| 2006/0154725 A1 | 7/2006 | Glaser et al. |
| 2006/0156415 A1 | 7/2006 | Rubinstein et al. |
| 2006/0158433 A1 | 7/2006 | Serban et al. |
| 2006/0181514 A1 | 8/2006 | Newman |
| 2006/0181521 A1 | 8/2006 | Perreault et al. |
| 2006/0187216 A1 | 8/2006 | Trent, Jr. et al. |
| 2006/0195522 A1 | 8/2006 | Miyazaki |
| 2006/0197753 A1 | 9/2006 | Hotelling |
| 2006/0197754 A1 | 9/2006 | Keely et al. |
| 2006/0197755 A1 | 9/2006 | Bawany |
| 2006/0209050 A1 | 9/2006 | Serban |
| 2006/0238510 A1 | 10/2006 | Panotopoulos et al. |
| 2006/0248597 A1 | 11/2006 | Keneman |
| 2007/0043725 A1 | 2/2007 | Hotelling et al. |
| 2007/0047221 A1 | 3/2007 | Park |
| 2007/0051792 A1 | 3/2007 | Wheeler et al. |
| 2007/0056385 A1 | 3/2007 | Lorenz |
| 2007/0062089 A1 | 3/2007 | Homer et al. |
| 2007/0069153 A1 | 3/2007 | Pai-Paranjape et al. |
| 2007/0072474 A1 | 3/2007 | Beasley et al. |
| 2007/0145945 A1 | 6/2007 | McGinley et al. |
| 2007/0152983 A1 | 7/2007 | McKillop et al. |
| 2007/0182663 A1 | 8/2007 | Biech |
| 2007/0182722 A1 | 8/2007 | Hotelling et al. |
| 2007/0200830 A1 | 8/2007 | Yamamoto |
| 2007/0205995 A1 | 9/2007 | Woolley |
| 2007/0220708 A1 | 9/2007 | Lewis |
| 2007/0234420 A1 | 10/2007 | Novotney et al. |
| 2007/0236408 A1 | 10/2007 | Yamaguchi et al. |
| 2007/0236472 A1 | 10/2007 | Bentsen et al. |
| 2007/0236475 A1 | 10/2007 | Wherry |
| 2007/0247338 A1 | 10/2007 | Marchetto |
| 2007/0247432 A1 | 10/2007 | Oakley |
| 2007/0257821 A1 | 11/2007 | Son et al. |
| 2007/0260892 A1 | 11/2007 | Paul et al. |
| 2007/0274094 A1 | 11/2007 | Schultz et al. |
| 2007/0274095 A1 | 11/2007 | Destain |
| 2007/0283179 A1 | 12/2007 | Burnett et al. |
| 2008/0005423 A1 | 1/2008 | Jacobs et al. |
| 2008/0012835 A1 | 1/2008 | Rimon et al. |
| 2008/0013809 A1 | 1/2008 | Zhu et al. |
| 2008/0018608 A1 | 1/2008 | Serban et al. |
| 2008/0018611 A1 | 1/2008 | Serban et al. |
| 2008/0024459 A1 | 1/2008 | Poupyrev et al. |
| 2008/0042994 A1 | 2/2008 | Gillespie et al. |
| 2008/0094367 A1 | 4/2008 | Van De Ven et al. |
| 2008/0104437 A1 | 5/2008 | Lee |
| 2008/0151478 A1 | 6/2008 | Chern |
| 2008/0158185 A1 | 7/2008 | Westerman |
| 2008/0167832 A1 | 7/2008 | Soss |
| 2008/0180411 A1 | 7/2008 | Solomon et al. |
| 2008/0202251 A1 | 8/2008 | Serban et al. |
| 2008/0202824 A1 | 8/2008 | Philipp et al. |
| 2008/0219025 A1 | 9/2008 | Spitzer et al. |
| 2008/0228969 A1 | 9/2008 | Cheah et al. |
| 2008/0232061 A1 | 9/2008 | Wang et al. |
| 2008/0238884 A1 | 10/2008 | Harish |

(56) References Cited

U.S. PATENT DOCUMENTS

| | | |
|---|---|---|
| 2008/0253822 A1 | 10/2008 | Matias |
| 2008/0297878 A1 | 12/2008 | Brown et al. |
| 2008/0303646 A1 | 12/2008 | Elwell et al. |
| 2008/0309636 A1 | 12/2008 | Feng et al. |
| 2008/0316002 A1 | 12/2008 | Brunet et al. |
| 2008/0316066 A1 | 12/2008 | Minato et al. |
| 2008/0320190 A1 | 12/2008 | Lydon et al. |
| 2009/0002218 A1 | 1/2009 | Rigazio et al. |
| 2009/0007001 A1 | 1/2009 | Morin et al. |
| 2009/0009476 A1 | 1/2009 | Daley, III |
| 2009/0046416 A1 | 2/2009 | Daley, III |
| 2009/0049979 A1 | 2/2009 | Naik et al. |
| 2009/0065267 A1 | 3/2009 | Sato |
| 2009/0073060 A1 | 3/2009 | Shimasaki et al. |
| 2009/0073957 A1 | 3/2009 | Newland et al. |
| 2009/0079639 A1 | 3/2009 | Hotta et al. |
| 2009/0083562 A1 | 3/2009 | Park et al. |
| 2009/0085878 A1 | 4/2009 | Heubel et al. |
| 2009/0090568 A1 | 4/2009 | Min |
| 2009/0101417 A1 | 4/2009 | Suzuki et al. |
| 2009/0106655 A1 | 4/2009 | Grant et al. |
| 2009/0117955 A1 | 5/2009 | Lo |
| 2009/0127005 A1 | 5/2009 | Zachut et al. |
| 2009/0128374 A1 | 5/2009 | Reynolds et al. |
| 2009/0135142 A1 | 5/2009 | Fu et al. |
| 2009/0140985 A1 | 6/2009 | Liu |
| 2009/0160529 A1 | 6/2009 | Lamborghini et al. |
| 2009/0163147 A1 | 6/2009 | Steigerwald et al. |
| 2009/0167704 A1 | 7/2009 | Terlizzi et al. |
| 2009/0174679 A1 | 7/2009 | Westerman |
| 2009/0182901 A1 | 7/2009 | Callaghan et al. |
| 2009/0195497 A1 | 8/2009 | Fitzgerald et al. |
| 2009/0219250 A1 | 9/2009 | Ure |
| 2009/0231019 A1 | 9/2009 | Yeh |
| 2009/0231275 A1 | 9/2009 | Odgers |
| 2009/0250267 A1 | 10/2009 | Heubel et al. |
| 2009/0251008 A1 | 10/2009 | Sugaya |
| 2009/0259865 A1 | 10/2009 | Sheynblat et al. |
| 2009/0262492 A1 | 10/2009 | Whitchurch et al. |
| 2009/0265670 A1 | 10/2009 | Kim et al. |
| 2009/0267892 A1 | 10/2009 | Faubert |
| 2009/0284397 A1 | 11/2009 | Lee et al. |
| 2009/0303137 A1 | 12/2009 | Kusaka et al. |
| 2009/0303204 A1 | 12/2009 | Nasiri et al. |
| 2009/0320244 A1 | 12/2009 | Lin |
| 2009/0321490 A1 | 12/2009 | Groene et al. |
| 2010/0001963 A1 | 1/2010 | Doray et al. |
| 2010/0013319 A1 | 1/2010 | Kamiyama et al. |
| 2010/0013613 A1 | 1/2010 | Weston |
| 2010/0026656 A1 | 2/2010 | Hotelling et al. |
| 2010/0038821 A1 | 2/2010 | Jenkins et al. |
| 2010/0039764 A1 | 2/2010 | Locker et al. |
| 2010/0045609 A1 | 2/2010 | Do et al. |
| 2010/0045633 A1 | 2/2010 | Gettemy |
| 2010/0051356 A1 | 3/2010 | Stern et al. |
| 2010/0051432 A1 | 3/2010 | Lin et al. |
| 2010/0053087 A1 | 3/2010 | Dai et al. |
| 2010/0053534 A1 | 3/2010 | Hsieh et al. |
| 2010/0075517 A1 | 3/2010 | Ni et al. |
| 2010/0077237 A1 | 3/2010 | Sawyers |
| 2010/0081377 A1 | 4/2010 | Chatterjee et al. |
| 2010/0085321 A1 | 4/2010 | Pundsack |
| 2010/0097198 A1 | 4/2010 | Suzuki |
| 2010/0102182 A1 | 4/2010 | Lin |
| 2010/0103112 A1 | 4/2010 | Yoo et al. |
| 2010/0103131 A1 | 4/2010 | Segal et al. |
| 2010/0123686 A1 | 5/2010 | Klinghult et al. |
| 2010/0133398 A1 | 6/2010 | Chiu et al. |
| 2010/0137033 A1 | 6/2010 | Lee |
| 2010/0141588 A1 | 6/2010 | Kimura et al. |
| 2010/0142130 A1 | 6/2010 | Wang et al. |
| 2010/0149111 A1 | 6/2010 | Olien |
| 2010/0149134 A1 | 6/2010 | Westerman et al. |
| 2010/0156798 A1 | 6/2010 | Archer |
| 2010/0161522 A1 | 6/2010 | Tirpak et al. |
| 2010/0162109 A1 | 6/2010 | Chatterjee et al. |
| 2010/0162179 A1 | 6/2010 | Porat |
| 2010/0164857 A1 | 7/2010 | Liu et al. |
| 2010/0171708 A1 | 7/2010 | Chuang |
| 2010/0171891 A1 | 7/2010 | Kaji et al. |
| 2010/0174421 A1 | 7/2010 | Tsai et al. |
| 2010/0180063 A1 | 7/2010 | Ananny et al. |
| 2010/0182263 A1 | 7/2010 | Aunio et al. |
| 2010/0188299 A1 | 7/2010 | Rinehart et al. |
| 2010/0188338 A1 | 7/2010 | Longe |
| 2010/0206614 A1 | 8/2010 | Park et al. |
| 2010/0206644 A1 | 8/2010 | Yeh |
| 2010/0214257 A1 | 8/2010 | Wussler et al. |
| 2010/0222110 A1 | 9/2010 | Kim et al. |
| 2010/0231498 A1 | 9/2010 | Large et al. |
| 2010/0231510 A1 | 9/2010 | Sampsell et al. |
| 2010/0231556 A1 | 9/2010 | Mines et al. |
| 2010/0238075 A1 | 9/2010 | Pourseyed |
| 2010/0238119 A1 | 9/2010 | Dubrovsky et al. |
| 2010/0238138 A1 | 9/2010 | Goertz et al. |
| 2010/0245221 A1 | 9/2010 | Khan |
| 2010/0250988 A1 | 9/2010 | Okuda et al. |
| 2010/0274932 A1 | 10/2010 | Kose |
| 2010/0279768 A1 | 11/2010 | Huang et al. |
| 2010/0289457 A1 | 11/2010 | Onnerud et al. |
| 2010/0289508 A1 | 11/2010 | Joguet et al. |
| 2010/0295812 A1 | 11/2010 | Burns et al. |
| 2010/0302378 A1 | 12/2010 | Marks et al. |
| 2010/0304793 A1 | 12/2010 | Kim |
| 2010/0306538 A1 | 12/2010 | Thomas et al. |
| 2010/0308778 A1 | 12/2010 | Yamazaki et al. |
| 2010/0308844 A1 | 12/2010 | Day et al. |
| 2010/0315267 A1 | 12/2010 | Chung et al. |
| 2010/0315348 A1 | 12/2010 | Jellicoe et al. |
| 2010/0321299 A1 | 12/2010 | Shelley et al. |
| 2010/0321301 A1 | 12/2010 | Casparian et al. |
| 2010/0321330 A1 | 12/2010 | Lim et al. |
| 2010/0321339 A1 | 12/2010 | Kimmel |
| 2010/0325155 A1 | 12/2010 | Skinner et al. |
| 2010/0331059 A1 | 12/2010 | Apgar et al. |
| 2011/0007008 A1 | 1/2011 | Algreatly |
| 2011/0012873 A1 | 1/2011 | Prest et al. |
| 2011/0018556 A1 | 1/2011 | Le et al. |
| 2011/0019123 A1 | 1/2011 | Prest et al. |
| 2011/0031287 A1 | 2/2011 | Le Gette et al. |
| 2011/0036965 A1 | 2/2011 | Zhang et al. |
| 2011/0037721 A1 | 2/2011 | Cranfill et al. |
| 2011/0043990 A1 | 2/2011 | Mickey et al. |
| 2011/0050587 A1 | 3/2011 | Natanzon et al. |
| 2011/0050630 A1 | 3/2011 | Ikeda |
| 2011/0055407 A1 | 3/2011 | Lydon et al. |
| 2011/0057899 A1 | 3/2011 | Sleeman et al. |
| 2011/0060926 A1 | 3/2011 | Brooks et al. |
| 2011/0069148 A1 | 3/2011 | Jones et al. |
| 2011/0074688 A1 | 3/2011 | Hull et al. |
| 2011/0080347 A1 | 4/2011 | Steeves et al. |
| 2011/0084909 A1 | 4/2011 | Hsieh et al. |
| 2011/0095994 A1 | 4/2011 | Birnbaum |
| 2011/0096513 A1 | 4/2011 | Kim |
| 2011/0102326 A1 | 5/2011 | Casparian et al. |
| 2011/0102356 A1 | 5/2011 | Kemppinen et al. |
| 2011/0115712 A1 | 5/2011 | Han et al. |
| 2011/0115747 A1 | 5/2011 | Powell et al. |
| 2011/0118025 A1 | 5/2011 | Lukas et al. |
| 2011/0134032 A1 | 6/2011 | Chiu et al. |
| 2011/0134112 A1 | 6/2011 | Koh et al. |
| 2011/0141052 A1* | 6/2011 | Bernstein ............ G06F 3/016 345/174 |
| 2011/0141053 A1* | 6/2011 | Bulea ............... G06F 3/0416 345/174 |
| 2011/0147398 A1 | 6/2011 | Ahee et al. |
| 2011/0148793 A1 | 6/2011 | Ciesla et al. |
| 2011/0157087 A1 | 6/2011 | Kanehira et al. |
| 2011/0163955 A1 | 7/2011 | Nasiri et al. |
| 2011/0164370 A1 | 7/2011 | McClure et al. |
| 2011/0167181 A1 | 7/2011 | Minoo et al. |
| 2011/0167287 A1 | 7/2011 | Walsh et al. |
| 2011/0167391 A1 | 7/2011 | Momeyer et al. |
| 2011/0167992 A1 | 7/2011 | Eventoff et al. |

(56) References Cited

U.S. PATENT DOCUMENTS

| | | |
|---|---|---|
| 2011/0179864 A1 | 7/2011 | Raasch et al. |
| 2011/0184646 A1 | 7/2011 | Wong et al. |
| 2011/0193787 A1 | 8/2011 | Morishige et al. |
| 2011/0193938 A1 | 8/2011 | Oderwald et al. |
| 2011/0202878 A1 | 8/2011 | Park et al. |
| 2011/0205372 A1 | 8/2011 | Miramontes |
| 2011/0216266 A1 | 9/2011 | Travis |
| 2011/0227913 A1 | 9/2011 | Hyndman |
| 2011/0231682 A1 | 9/2011 | Kakish et al. |
| 2011/0234502 A1 | 9/2011 | Yun et al. |
| 2011/0241999 A1 | 10/2011 | Thier |
| 2011/0242138 A1 | 10/2011 | Tribble |
| 2011/0248152 A1 | 10/2011 | Svajda et al. |
| 2011/0248920 A1 | 10/2011 | Larsen |
| 2011/0248930 A1 | 10/2011 | Kwok et al. |
| 2011/0248941 A1 | 10/2011 | Abdo et al. |
| 2011/0261001 A1 | 10/2011 | Liu |
| 2011/0261021 A1 | 10/2011 | Modarres et al. |
| 2011/0261083 A1 | 10/2011 | Wilson |
| 2011/0267294 A1 | 11/2011 | Kildal |
| 2011/0267300 A1 | 11/2011 | Serban et al. |
| 2011/0267757 A1 | 11/2011 | Probst |
| 2011/0290686 A1 | 12/2011 | Huang |
| 2011/0291922 A1 | 12/2011 | Stewart et al. |
| 2011/0295697 A1 | 12/2011 | Boston et al. |
| 2011/0297566 A1 | 12/2011 | Gallagher et al. |
| 2011/0304577 A1 | 12/2011 | Brown et al. |
| 2011/0304962 A1 | 12/2011 | Su |
| 2011/0306424 A1 | 12/2011 | Kazama et al. |
| 2011/0316807 A1 | 12/2011 | Corrion |
| 2012/0007821 A1 | 1/2012 | Zaliva |
| 2012/0011462 A1 | 1/2012 | Westerman et al. |
| 2012/0013519 A1 | 1/2012 | Hakansson et al. |
| 2012/0023459 A1 | 1/2012 | Westerman |
| 2012/0024682 A1 | 2/2012 | Huang et al. |
| 2012/0026048 A1 | 2/2012 | Vazquez et al. |
| 2012/0044179 A1 | 2/2012 | Hudson |
| 2012/0047368 A1 | 2/2012 | Chinn et al. |
| 2012/0050975 A1 | 3/2012 | Garelli et al. |
| 2012/0055770 A1 | 3/2012 | Chen |
| 2012/0068933 A1 | 3/2012 | Larsen |
| 2012/0068957 A1 | 3/2012 | Puskarich et al. |
| 2012/0072167 A1 | 3/2012 | Cretella, Jr. et al. |
| 2012/0075221 A1 | 3/2012 | Yasuda |
| 2012/0075249 A1 | 3/2012 | Hoch |
| 2012/0081316 A1 | 4/2012 | Sirpal et al. |
| 2012/0087078 A1 | 4/2012 | Medica et al. |
| 2012/0092279 A1 | 4/2012 | Martin |
| 2012/0092350 A1 | 4/2012 | Ganapathi et al. |
| 2012/0094257 A1 | 4/2012 | Pillischer et al. |
| 2012/0098751 A1 | 4/2012 | Liu |
| 2012/0099263 A1 | 4/2012 | Lin |
| 2012/0099749 A1 | 4/2012 | Rubin et al. |
| 2012/0106082 A1 | 5/2012 | Wu et al. |
| 2012/0113579 A1 | 5/2012 | Agata et al. |
| 2012/0115553 A1 | 5/2012 | Mahe et al. |
| 2012/0117409 A1 | 5/2012 | Lee et al. |
| 2012/0127071 A1 | 5/2012 | Jitkoff et al. |
| 2012/0127118 A1 | 5/2012 | Nolting et al. |
| 2012/0139844 A1 | 6/2012 | Ramstein et al. |
| 2012/0140396 A1 | 6/2012 | Zeliff et al. |
| 2012/0145525 A1 | 6/2012 | Ishikawa |
| 2012/0146938 A1* | 6/2012 | Worfolk ............... G06F 3/044 345/174 |
| 2012/0155015 A1 | 6/2012 | Govindasamy et al. |
| 2012/0162693 A1 | 6/2012 | Ito |
| 2012/0175487 A1 | 7/2012 | Goto |
| 2012/0182242 A1 | 7/2012 | Lindahl et al. |
| 2012/0188180 A1 | 7/2012 | Yang et al. |
| 2012/0194393 A1 | 8/2012 | Uttermann et al. |
| 2012/0194448 A1 | 8/2012 | Rothkopf |
| 2012/0200532 A1 | 8/2012 | Powell et al. |
| 2012/0200802 A1 | 8/2012 | Large |
| 2012/0206401 A1 | 8/2012 | Lin et al. |
| 2012/0206937 A1 | 8/2012 | Travis et al. |
| 2012/0223866 A1 | 9/2012 | Ayala Vazquez et al. |
| 2012/0224073 A1 | 9/2012 | Miyahara |
| 2012/0229401 A1 | 9/2012 | Birnbaum et al. |
| 2012/0235635 A1 | 9/2012 | Sato |
| 2012/0235921 A1 | 9/2012 | Laubach |
| 2012/0235942 A1 | 9/2012 | Shahoian et al. |
| 2012/0242588 A1 | 9/2012 | Myers et al. |
| 2012/0246377 A1 | 9/2012 | Bhesania |
| 2012/0249459 A1 | 10/2012 | Sashida et al. |
| 2012/0256959 A1 | 10/2012 | Ye et al. |
| 2012/0268412 A1 | 10/2012 | Cruz-hernandez et al. |
| 2012/0268911 A1 | 10/2012 | Lin |
| 2012/0274811 A1 | 11/2012 | Bakin |
| 2012/0287562 A1 | 11/2012 | Wu et al. |
| 2012/0299866 A1 | 11/2012 | Pao et al. |
| 2012/0300275 A1 | 11/2012 | Vilardell et al. |
| 2012/0304199 A1 | 11/2012 | Homma et al. |
| 2012/0312955 A1 | 12/2012 | Randolph |
| 2012/0328349 A1 | 12/2012 | Isaac et al. |
| 2013/0009892 A1 | 1/2013 | Salmela et al. |
| 2013/0044059 A1 | 2/2013 | Fu |
| 2013/0047747 A1 | 2/2013 | Joung, II |
| 2013/0063364 A1 | 3/2013 | Moore |
| 2013/0063389 A1 | 3/2013 | Moore |
| 2013/0063873 A1 | 3/2013 | Wodrich et al. |
| 2013/0076646 A1 | 3/2013 | Krah et al. |
| 2013/0088431 A1 | 4/2013 | Ballagas et al. |
| 2013/0088442 A1 | 4/2013 | Lee |
| 2013/0094131 A1 | 4/2013 | O'Donnell et al. |
| 2013/0097534 A1 | 4/2013 | Lewin et al. |
| 2013/0106766 A1 | 5/2013 | Yilmaz et al. |
| 2013/0107144 A1 | 5/2013 | Marhefka et al. |
| 2013/0141370 A1 | 6/2013 | Wang et al. |
| 2013/0167663 A1 | 7/2013 | Eventoff |
| 2013/0194235 A1 | 8/2013 | Zanone et al. |
| 2013/0201115 A1 | 8/2013 | Heubel |
| 2013/0207917 A1 | 8/2013 | Cruz-hernandez et al. |
| 2013/0222286 A1 | 8/2013 | Kang et al. |
| 2013/0227836 A1 | 9/2013 | Whitt, III et al. |
| 2013/0228433 A1 | 9/2013 | Shaw |
| 2013/0229273 A1 | 9/2013 | Nodar Cortizo et al. |
| 2013/0229356 A1 | 9/2013 | Marwah et al. |
| 2013/0229386 A1 | 9/2013 | Bathiche |
| 2013/0275058 A1 | 10/2013 | Awad |
| 2013/0278542 A1 | 10/2013 | Stephanou et al. |
| 2013/0278552 A1 | 10/2013 | Kamin-Lyndgaard |
| 2013/0300683 A1 | 11/2013 | Birnbaum et al. |
| 2013/0304941 A1 | 11/2013 | Drasnin |
| 2013/0304944 A1 | 11/2013 | Young |
| 2013/0311881 A1 | 11/2013 | Birnbaum et al. |
| 2013/0314341 A1 | 11/2013 | Lee et al. |
| 2013/0321291 A1 | 12/2013 | Sim |
| 2013/0335209 A1 | 12/2013 | Cruz-hernandez et al. |
| 2013/0335330 A1 | 12/2013 | Lane |
| 2013/0335902 A1 | 12/2013 | Campbell |
| 2013/0335903 A1 | 12/2013 | Raken |
| 2013/0342464 A1 | 12/2013 | Bathiche et al. |
| 2013/0342465 A1 | 12/2013 | Bathiche |
| 2013/0346636 A1 | 12/2013 | Bathiche |
| 2014/0008203 A1 | 1/2014 | Nathan et al. |
| 2014/0020484 A1 | 1/2014 | Shaw et al. |
| 2014/0022177 A1 | 1/2014 | Shaw |
| 2014/0028624 A1 | 1/2014 | Marsden et al. |
| 2014/0055375 A1 | 2/2014 | Kim et al. |
| 2014/0062933 A1 | 3/2014 | Coulson et al. |
| 2014/0062934 A1 | 3/2014 | Coulson et al. |
| 2014/0083207 A1 | 3/2014 | Eventoff |
| 2014/0085247 A1 | 3/2014 | Leung et al. |
| 2014/0098058 A1 | 4/2014 | Baharav et al. |
| 2014/0139436 A1 | 5/2014 | Ramstein et al. |
| 2014/0139472 A1 | 5/2014 | Takenaka |
| 2014/0152581 A1 | 6/2014 | Case et al. |
| 2014/0204059 A1 | 7/2014 | Geaghan |
| 2014/0210742 A1 | 7/2014 | Delattre et al. |
| 2014/0221098 A1 | 8/2014 | Boulanger |
| 2014/0230575 A1 | 8/2014 | Picciotto et al. |
| 2014/0232679 A1 | 8/2014 | Whitman et al. |
| 2014/0253305 A1 | 9/2014 | Rosenberg et al. |
| 2014/0306914 A1 | 10/2014 | Kagayama |

(56) References Cited

U.S. PATENT DOCUMENTS

| | | | |
|---|---|---|---|
| 2014/0313146 A1 | 10/2014 | Munechika | |
| 2014/0320393 A1 | 10/2014 | Modarres et al. | |
| 2014/0340356 A1 | 11/2014 | Takahashi et al. | |
| 2014/0368455 A1* | 12/2014 | Croisonnier | G06F 3/0414 345/173 |
| 2015/0084865 A1 | 3/2015 | Shaw et al. | |
| 2015/0084909 A1 | 3/2015 | Worfolk et al. | |
| 2015/0097786 A1 | 4/2015 | Behles et al. | |
| 2015/0130742 A1 | 5/2015 | Chen et al. | |
| 2015/0153951 A1 | 6/2015 | Kim et al. | |
| 2015/0160778 A1 | 6/2015 | Kim et al. | |
| 2015/0193034 A1 | 7/2015 | Jeong et al. | |
| 2015/0227207 A1 | 8/2015 | Winter et al. | |
| 2015/0242012 A1 | 8/2015 | Petcavich et al. | |
| 2015/0268827 A1 | 9/2015 | Kim et al. | |
| 2015/0301642 A1 | 10/2015 | Hanauer et al. | |
| 2015/0370376 A1 | 12/2015 | Harley et al. | |
| 2016/0018894 A1 | 1/2016 | Yliaho et al. | |
| 2016/0034087 A1 | 2/2016 | Kim et al. | |
| 2016/0070398 A1 | 3/2016 | Worfolk | |
| 2016/0195955 A1 | 7/2016 | Picciotto et al. | |
| 2016/0202760 A1 | 7/2016 | Churikov et al. | |
| 2016/0334912 A1 | 11/2016 | Ribeiro | |
| 2016/0357296 A1 | 12/2016 | Picciotto et al. | |
| 2017/0023418 A1 | 1/2017 | Shaw et al. | |
| 2017/0102770 A1 | 4/2017 | Winter et al. | |

FOREIGN PATENT DOCUMENTS

| | | |
|---|---|---|
| EP | 2353978 | 8/2011 |
| EP | 2381340 A2 | 10/2011 |
| EP | 2584432 | 4/2013 |
| GB | 2178570 | 2/1987 |
| JP | 10326124 | 12/1998 |
| JP | 1173239 | 3/1999 |
| JP | 11345041 | 12/1999 |
| KR | 1020110087178 | 8/2011 |
| NL | 1038411 | 5/2012 |
| WO | WO-2010011983 | 1/2010 |
| WO | WO-2012036717 | 3/2012 |
| WO | WO-2012173305 | 12/2012 |
| WO | WO-2013169299 | 11/2013 |
| WO | WO-2014098946 | 6/2014 |

OTHER PUBLICATIONS

"Accessing Device Sensors", retrieved from <https://developer.palm.com/content/api/dev-guide/pdk/accessing-device-sensors.html> on May 25, 2012, 2011, 4 pages.

"ACPI Docking for Windows Operating Systems", Retrieved from: <http://www.scritube.com/limba/engleza/software/ACPI-Docking-for-Windows-Opera331824193.php> on Jul. 6, 2012, 2012, 10 pages.

"Advanced Configuration and Power Management Specification", Intel Corporation, Microsoft Corporation, Toshiba Corp. Revision 1, Dec. 22, 1996, 364 pages.

"Cholesteric Liquid Crystal", Retrieved from: <http://en.wikipedia.org/wiki/Cholesteric_liquid_crystal> on Aug. 6, 2012, Jun. 10, 2012, 2 pages.

"Cirago Slim Case®—Protective case with built-in kickstand for your iPhone®", Retrieved from <http://cirago.com/wordpress/wp-content/uploads/2012/10/ipc1500brochure1.pdf> on Jan. 29, 2013, Jan. 2013, 1 page.

"Corrected Notice of Allowance", U.S. Appl. No. 13/470,633, dated Apr. 9, 2013, 2 pages.

"Corrected Notice of Allowance", U.S. Appl. No. 13/470,633, dated Jul. 2, 2013, 2 pages.

"Developing Next-Generation Human Interfaces using Capacitive and Infrared Proximity Sensing", Silicon Laboratories, Inc., Available at <http://www.silabs.com/pages/DownloadDoc.aspx?FILEURL=support%20documents/technicaldocs/capacitive%20and%20proximity%20sensing_wp.pdf&src=SearchResults>, Aug. 30, 2010, pp. 1-10.

"Directional Backlighting for Display Panels", U.S. Appl. No. 13/021,448, filed Feb. 4, 2011, 38 pages.

"DR2PA", retrieved from <http://www.architainment.co.uk/wp-content/uploads/2012/08/DR2PA-AU-US-size-Data-Sheet-Rev-H_LOGO.pdf> on Sep. 17, 2012, Jan. 2012, 4 pages.

"Ex Parte Quayle Action", U.S. Appl. No. 13/599,763, filed Nov. 14, 2014, 6 pages.

"Final Office Action", U.S. Appl. No. 13/471,001, dated Jul. 25, 2013, 20 pages.

"Final Office Action", U.S. Appl. No. 13/527,263, dated Jan. 27, 2015, 7 pages.

"Final Office Action", U.S. Appl. No. 13/603,918, dated Mar. 21, 2014, 14 pages.

"Final Office Action", U.S. Appl. No. 13/647,479, dated Dec. 12, 2014, 12 pages.

"Final Office Action", U.S. Appl. No. 13/651,195, dated Apr. 18, 2013, 13 pages.

"Final Office Action", U.S. Appl. No. 13/651,232, dated May 21, 2013, 21 pages.

"Final Office Action", U.S. Appl. No. 13/651,287, dated May 3, 2013, 16 pages.

"Final Office Action", U.S. Appl. No. 13/651,976, dated Jul. 25, 2013, 21 pages.

"Final Office Action", U.S. Appl. No. 13/653,321, dated Aug. 2, 2013, 17 pages.

"Final Office Action", U.S. Appl. No. 13/655,065, dated Aug. 8, 2014, 20 pages.

"Final Office Action", U.S. Appl. No. 13/974,749, dated Sep. 5, 2014, 18 pages.

"Final Office Action", U.S. Appl. No. 13/974,994, dated Oct. 6, 2014, 26 pages.

"Final Office Action", U.S. Appl. No. 13/975,087, dated Sep. 10, 2014, 19 pages.

"Final Office Action", U.S. Appl. No. 14/033,510, dated Aug. 21, 2014, 18 pages.

"First One Handed Fabric Keyboard with Bluetooth Wireless Technology", Retrieved from: <http://press.xtvworld.com/article3817.html> on May 8, 2012, Jan. 6, 2005, 2 pages.

"Force and Position Sensing Resistors: An Emerging Technology", Interlink Electronics, Available at <http://staff.science.uva.nl/~vlaander/docu/FSR/An_Exploring_Technology.pdf>, Feb. 1990, pp. 1-6.

"Frogpad Introduces Weareable Fabric Keyboard with Bluetooth Technology", Retrieved from: <http://www.geekzone.co.nz/content.asp?contentid=3898> on May 7, 2012, Jan. 7, 2005, 3 pages.

"How to Use the iPad's Onscreen Keyboard", Retrieved from <http://www.dummies.com/how-to/content/how-to-use-the-ipads-onscreen-keyboard.html> on Aug. 28, 2012, 2012, 3 pages.

"iControlPad 2—The open source controller", Retrieved from < http://www.kickstarter.com/projects/1703567677/icontrolpad-2-the-open-source-controller> on Nov. 20, 2012, 2012, 15 pages.

"i-Interactor electronic pen", Retrieved from: <http://www.alibaba.com/product-gs/331004878/i_Interactor_electronic_pen.html> on Jun. 19, 2012, 2012, 5 pages.

"Incipio LG G-Slate Premium Kickstand Case—Black Nylon", Retrieved from: <http://www.amazon.com/Incipio-G-Slate-Premium-Kickstand-Case/dp/B004ZKP916> on May 8, 2012, 2012, 4 pages.

"International Search Report and Written Opinion", Application No. PCT/US2014/056185, dated Dec. 4, 2014, 10 pages.

"International Search Report and Written Opinion", Application No. PCT/US2013/028948, dated Jun. 21, 2013, 11 pages.

"International Search Report and Written Opinion", Application No. PCT/US2013/029461, dated Jun. 21, 2013, 11 pages.

"International Search Report and Written Opinion", Application No. PCT/US2013/040968, dated Sep. 5, 2013, 11 pages.

"International Search Report and Written Opinion", Application No. PCT/US2013/044871, dated Aug. 14, 2013, 12 pages.

"International Search Report and Written Opinion", Application No. PCT/US2014/014522, dated Jun. 6, 2014, 13 pages.

"International Search Report and Written Opinion", Application No. PCT/US2013/045283, dated Mar. 12, 2014, 19 pages.

"International Search Report and Written Opinion", Application No. PCT/US2013/044873, dated Nov. 22, 2013, 9 pages.

(56) References Cited

OTHER PUBLICATIONS

"International Search Report and Written Opinion", Application No. PCT/US2013/045049, dated Sep. 16, 2013, 9 pages.
"Membrane Keyboards & Membrane Keypads", Retrieved from: <http://www.pannam.com/> on May 9, 2012, Mar. 4, 2009, 2 pages.
"Microsoft Tablet PC", Retrieved from <http://web.archive.org/web/20120622064335/https://en.wikipedia.org/wiki/Microsoft_Tablet_PC> on Jun. 4, 2014, Jun. 21, 2012, 9 pages.
"Motion Sensors", Android Developers—retrieved from <http://developer.android.com/guide/topics/sensors/sensors_motion.html> on May 25, 2012, 2012, 7 pages.
"MPC Fly Music Production Controller", AKAI Professional, Retrieved from: <http://www.akaiprompc.com/mpc-fly> on Jul. 9, 2012, 4 pages.
"NI Releases New Maschine & Maschine Mikro", Retrieved from <http://www.djbooth.net/index/dj-equipment/entry/ni-releases-new-maschine-mikro/> on Sep. 17, 2012, 19 pages.
"Non-Final Office Action", U.S. Appl. No. 13/021,448, dated Dec. 13, 2012, 9 pages.
"Non-Final Office Action", U.S. Appl. No. 13/471,001, dated Feb. 19, 2013, 15 pages.
"Non-Final Office Action", U.S. Appl. No. 13/471,139, dated Mar. 21, 2013, 12 pages.
"Non-Final Office Action", U.S. Appl. No. 13/471,202, dated Feb. 11, 2013, 10 pages.
"Non-Final Office Action", U.S. Appl. No. 13/471,336, dated Jan. 18, 2013, 14 pages.
"Non-Final Office Action", U.S. Appl. No. 13/527,263, dated Apr. 3, 2014, 6 pages.
"Non-Final Office Action", U.S. Appl. No. 13/527,263, dated Jul. 19, 2013, 5 pages.
"Non-Final Office Action", U.S. Appl. No. 13/563,435, dated Jun. 14, 2013, 6 pages.
"Non-Final Office Action", U.S. Appl. No. 13/564,520, dated Jun. 19, 2013, 8 pages.
"Non-Final Office Action", U.S. Appl. No. 13/565,124, dated Jun. 17, 2013, 5 pages.
"Non-Final Office Action", U.S. Appl. No. 13/599,763, dated May 28, 2014, 6 pages.
"Non-Final Office Action", U.S. Appl. No. 13/603,918, dated Sep. 2, 2014, 13 pages.
"Non-Final Office Action", U.S. Appl. No. 13/603,918, dated Dec. 19, 2013, 12 pages.
"Non-Final Office Action", U.S. Appl. No. 13/645,405, dated Jan. 31, 2014, 6 pages.
"Non-Final Office Action", U.S. Appl. No. 13/645,405, dated Aug. 11, 2014, 5 pages.
"Non-Final Office Action", U.S. Appl. No. 13/647,479, dated Jul. 3, 2014, 10 pages.
"Non-Final Office Action", U.S. Appl. No. 13/651,195, dated Jan. 2, 2013, 14 pages.
"Non-Final Office Action", U.S. Appl. No. 13/651,232, dated Jan. 17, 2013, 15 pages.
"Non-Final Office Action", U.S. Appl. No. 13/651,272, dated Feb. 12, 2013, 10 pages.
"Non-Final Office Action", U.S. Appl. No. 13/651,287, dated Jan. 29, 2013, 13 pages.
"Non-Final Office Action", U.S. Appl. No. 13/651,304, dated Mar. 22, 2013, 9 pages.
"Non-Final Office Action", U.S. Appl. No. 13/651,327, dated Mar. 22, 2013, 6 pages.
"Non-Final Office Action", U.S. Appl. No. 13/651,726, dated Apr. 15, 2013, 6 pages.
"Non-Final Office Action", U.S. Appl. No. 13/651,871, dated Mar. 18, 2013, 14 pages.
"Non-Final Office Action", U.S. Appl. No. 13/651,871, dated Jul. 1, 2013, 5 pages.
"Non-Final Office Action", U.S. Appl. No. 13/651,976, dated Feb. 22, 2013, 16 pages.
"Non-Final Office Action", U.S. Appl. No. 13/653,321, dated Feb. 1, 2013, 13 pages.
"Non-Final Office Action", U.S. Appl. No. 13/653,682, dated Feb. 7, 2013, 11 pages.
"Non-Final Office Action", U.S. Appl. No. 13/653,682, dated Jun. 3, 2013, 14 pages.
"Non-Final Office Action", U.S. Appl. No. 13/655,065, dated Apr. 24, 2014, 16 pages.
"Non-Final Office Action", U.S. Appl. No. 13/655,065, dated Dec. 19, 2014, 24 pages.
"Non-Final Office Action", U.S. Appl. No. 13/656,055, dated Apr. 23, 2013, 11 pages.
"Non-Final Office Action", U.S. Appl. No. 13/656,520, dated Feb. 1, 2013, 15 pages.
"Non-Final Office Action", U.S. Appl. No. 13/656,520, dated Jun. 5, 2013, 8 pages.
"Non-Final Office Action", U.S. Appl. No. 13/759,875, dated Aug. 1, 2014, 16 pages.
"Non-Final Office Action", U.S. Appl. No. 13/974,749, dated Feb. 12, 2015, 15 pages.
"Non-Final Office Action", U.S. Appl. No. 13/974,749, dated May 8, 2014, 16 pages.
"Non-Final Office Action", U.S. Appl. No. 13/974,994, dated Jan. 23, 2015, 26 pages.
"Non-Final Office Action", U.S. Appl. No. 13/974,994, dated Jun. 4, 2014, 24 pages.
"Non-Final Office Action", U.S. Appl. No. 13/975,087, dated Feb. 27, 2015, 20 pages.
"Non-Final Office Action", U.S. Appl. No. 13/975,087, dated May 8, 2014, 18 pages.
"Non-Final Office Action", U.S. Appl. No. 14/033,510, dated Feb. 12, 2015, 17 pages.
"Non-Final Office Action", U.S. Appl. No. 14/033,510, dated Jun. 5, 2014, 16 pages.
"Notice of Allowance", U.S. Appl. No. 13/470,633, dated Mar. 22, 2013, 7 pages.
"Notice of Allowance", U.S. Appl. No. 13/471,202, dated May 28, 2013, 7 pages.
"Notice of Allowance", U.S. Appl. No. 13/599,763, dated Feb. 18, 2015, 4 pages.
"Notice of Allowance", U.S. Appl. No. 13/603,918, dated Jan. 22, 2015, 8 pages.
"Notice of Allowance", U.S. Appl. No. 13/651,195, dated Jul. 8, 2013, 9 pages.
"Notice of Allowance", U.S. Appl. No. 13/651,272, dated May 2, 2013, 7 pages.
"Notice of Allowance", U.S. Appl. No. 13/651,304, dated Jul. 1, 2013, 5 pages.
"Notice of Allowance", U.S. Appl. No. 13/651,327, dated Jun. 11, 2013, 7 pages.
"Notice of Allowance", U.S. Appl. No. 13/651,726, dated May 31, 2013, 5 pages.
"On-Screen Keyboard for Windows 7, Vista, XP with Touchscreen", Retrieved from <www.comfort-software.com/on-screen-keyboard.html> on Aug. 28, 2012, Feb. 2, 2011, 3 pages.
"Optical Sensors in Smart Mobile Devices", ON Semiconductor, TND415/D, Available at <http://www.onsemi.jp/pub_link/Collateral/TND415-D.PDF>, Nov. 2010, pp. 1-13.
"Optics for Displays: Waveguide-based Wedge Creates Collimated Display Backlight", OptoIQ, retrieved from <http://www.optoiq.com/index/photonics-technologies-applications/lfw-display/lfw-article-display.articles.laser-focus-world.volume-46.issue-1.world-news.optics-for_displays.html> on Nov. 2, 2010, Jan. 1, 2010, 3 pages.
"Position Sensors", Android Developers—retrieved from <http://developer.android.com/guide/topics/sensors/sensors_position.html> on May 25, 2012, 5 pages.
"Reflex LCD Writing Tablets", retrieved from <http://www.kentdisplays.com/products/lcdwritingtablets.html> on Jun. 27, 2012, 3 pages.
"Restriction Requirement", U.S. Appl. No. 13/603,918, dated Nov. 27, 2013, 8 pages.

(56) References Cited

OTHER PUBLICATIONS

"Restriction Requirement", U.S. Appl. No. 13/471,139, dated Jan. 17, 2013, 7 pages.
"Restriction Requirement", U.S. Appl. No. 13/651,304, dated Jan. 18, 2013, 7 pages.
"Restriction Requirement", U.S. Appl. No. 13/651,726, dated Feb. 22, 2013, 6 pages.
"Restriction Requirement", U.S. Appl. No. 13/651,871, dated Feb. 7, 2013, 6 pages.
"Restriction Requirement", U.S. Appl. No. 13/715,229, dated Aug. 13, 2013, 7 pages.
"Smart Board™ Interactive Display Frame Pencil Pack", Available at <http://downloads01.smarttech.com/media/sitecore/en/support/product/sbfpd/400series(interactivedisplayframes)/guides/smartboardinteractivedisplayframepencilpackv12mar09.pdf>, 2009, 2 pages.
"Snugg iPad 3 Keyboard Case—Cover Ultra Slim Bluetooth Keyboard Case for the iPad 3 & iPad 2", Retrieved from <https://web.archive.org/web/20120810202056/http://www.amazon.com/Snugg-iPad-Keyboard-Case-Bluetooth/dp/B008CCHXJE> on Jan. 23, 2015, Aug. 10, 2012, 4 pages.
"SolRx™ E-Series Multidirectional Phototherapy ExpandableTM 2-Bulb Full Body Panel System", Retrieved from: <http://www.solarcsystems.com/us_multidirectional_uv_light_therapy_1_intro.html > on Jul. 25, 2012, 2011, 4 pages.
"The Microsoft Surface Tablets Comes With Impressive Design and Specs", Retrieved from <http://microsofttabletreview.com/the-microsoft-surface-tablets-comes-with-impressive-design-and-specs> on Jan. 30, 2013, Jun. 2012, 2 pages.
"Tilt Shift Lenses: Perspective Control", retrieved from http://www.cambridgeincolour.com/tutorials/tilt-shift-lenses1.htm, Mar. 28, 2008, 11 Pages.
"Virtualization Getting Started Guide", Red Hat Enterprise Linux 6, Edition 0.2—retrieved from <http://docs.redhat.com/docs/en-US/Red_Hat_Enterprise_Linux/6/html-single/Virtualization_Getting_Started_Guide/index.html> on Jun. 13, 2012, 24 pages.
"Visus Photonics—Visionary Technologies New Generation of Production Ready Keyboard-Keypad Illumination Systems", Available at: <http://www.visusphotonics.com/pdf/appl_keypad_keyboard_backlights.pdf>, May 2006, pp. 1-22.
"What is Active Alignment?", http://www.kasalis.com/active_alignment.html, retrieved on Nov. 22, 2012, Nov. 22, 2012, 2 Pages.
"Write & Learn Spellboard Advanced", Available at <http://somemanuals.com/VTECH,WRITE%2526LEARN--SPELLBOARD--ADV--71000,JIDFHE.PDF>, 2006, 22 pages.
"Writer 1 for iPad 1 keyboard + Case (Aluminum Bluetooth Keyboard, Quick Eject and Easy Angle Function!)", Retrieved from <https://web.archive.org/web/20120817053825/http://www.amazon.com/keyboard-Aluminum-Bluetooth-Keyboard-Function/dp/B004OQLSLG> on Jan. 23, 2015, Aug. 17, 2012, 5 pages.
Akamatsu,"Movement Characteristics Using a Mouse with Tactile and Force Feedback", In Proceedings of International Journal of Human-Computer Studies 45, No. 4, Oct. 1996, 11 pages.
Bathiche,"Input Device with Interchangeable Surface", U.S. Appl. No. 13/974,749, filed Aug. 23, 2013, 51 pages.
Block,"DeviceOrientation Event Specification", W3C, Editor's Draft, retrieved from <https://developer.palm.com/content/api/dev-guide/pdk/accessing-device-sensors.html> on May 25, 2012, Jul. 12, 2011, 14 pages.
Brown,"Microsoft Shows Off Pressure-Sensitive Keyboard", retrieved from <http://news.cnet.com/8301-17938_105-10304792-1.html> on May 7, 2012, Aug. 6, 2009, 2 pages.
Butler,"SideSight: Multi-"touch" Interaction around Small Devices", In the proceedings of the 21st annual ACM symposium on User interface software and technology., retrieved from <http://research.microsoft.com/pubs/132534/sidesight_cry3.pdf> on May 29, 2012, Oct. 19, 2008, 4 pages.
Chu,"Design and Analysis of a Piezoelectric Material Based Touch Screen With Additional Pressure and Its Acceleration Measurement Functions", In Proceedings of Smart Materials and Structures, vol. 22, Issue 12, Nov. 1, 2013, 2 pages.
Crider,"Sony Slate Concept Tablet "Grows" a Kickstand", Retrieved from: <http://androidcommunity.com/sony-slate-concept-tablet-grows-a-kickstand-20120116/> on May 4, 2012, Jan. 16, 2012, 9 pages.
Das,"Study of Heat Transfer through Multilayer Clothing Assemblies: A Theoretical Prediction", Retrieved from <http://www.autexrj.com/cms/zalaczone_pliki/5_013_11.pdf>, Jun. 2011, 7 pages.
Dietz,"A Practical Pressure Sensitive Computer Keyboard", In Proceedings of UIST 2009, Oct. 2009, 4 pages.
Gaver,"A Virtual Window on Media Space", retrieved from <http://www.gold.ac.uk/media/15gaver-smets-overbeeke.MediaSpaceWindow.chi95.pdf> on Jun. 1, 2012, retrieved from <http://www.gold.ac.uk/media/15gaver-smets-overbeeke.MediaSpaceWindow.chi95.pdf> on Jun. 1, 2012, May 7, 1995, 9 pages.
Glatt,"Channel and Key Pressure (Aftertouch).", Retrieved from: <http://home.roadrunner.com/~jgglatt/tutr/touch.htm> on Jun. 11, 2012, 2012, 2 pages.
Gong,"PrintSense: A Versatile Sensing Technique to Support Multimodal Flexible Surface Interaction", In Proceedings of the SIGCHI Conference on Human Factors in Computing Systems; retrieved from: http://dl.acm.org/citation.cfm?id=2556288.2557173&coll=DL&dl=ACM&CFID=571580473 &CFTOKEN=89752233 on Sep. 19, 2014, Apr. 26, 2014, 4 pages.
Hanlon,"ElekTex Smart Fabric Keyboard Goes Wireless", Retrieved from: <http://www.gizmag.com/go/5048/ > on May 7, 2012, Jan. 15, 2006, 5 pages.
Harada,"VoiceDraw: A Hands-Free Voice-Driven Drawing Application for People With Motor Impairments", In Proceedings of Ninth International ACM SIGACCESS Conference on Computers and Accessibility, retrieved from <http://citeseerx.ist.psu.edu/viewdoc/download?doi=10.1.1.113.7211&rep=rep1&type=pdf > on Jun. 1, 2012, Oct. 15, 2007, 8 pages.
Hinckley,"Touch-Sensing Input Devices", In Proceedings of ACM SIGCHI 1999, May 15, 1999, 8 pages.
Iwase,"Multistep Sequential Batch Assembly of Three-Dimensional Ferromagnetic Microstructures with Elastic Hinges", Retrieved at <<http://ieeexplore.ieee.org/stamp/stamp.jsp?tp=&arnumber=1549861>> Proceedings: Journal of Microelectromechanical Systems, Dec. 2005, 7 pages.
Kaufmann,"Hand Posture Recognition Using Real-time Artificial Evolution", EvoApplications'09, retrieved from <http://evelyne.lutton.free.fr/Papers/KaufmannEvolASP2010.pdf> on Jan. 5, 2012, Apr. 3, 2010, 10 pages.
Kaur,"Vincent Liew's redesigned laptop satisfies ergonomic needs", Retrieved from: <http://www.designbuzz.com/entry/vincent-liew-s-redesigned-laptop-satisfies-ergonomic-needs/> on Jul. 27, 2012, Jun. 21, 2010, 4 pages.
Khuntontong,"Fabrication of Molded Interconnection Devices by Ultrasonic Hot Embossing on Thin Polymer Films", IEEE Transactions on Electronics Packaging Manufacturing, vol. 32, No. 3, Jul. 2009, pp. 152-156.
Lane,"Media Processing Input Device", U.S. Appl. No. 13/655,065, filed Oct. 18, 2012, 43 pages.
Li,"Characteristic Mode Based Tradeoff Analysis of Antenna-Chassis Interactions for Multiple Antenna Terminals", In IEEE Transactions on Antennas and Propagation, Retrieved from <http://ieeexplore.ieee.org/stamp/stamp.jsp?tp=&arnumber=6060882>, Feb. 2012, 13 pages.
Linderholm,"Logitech Shows Cloth Keyboard for PDAs", Retrieved from: <http://www.pcworld.com/article/89084/logitech_shows_cloth_keyboard_for_pdas.html> on May 7, 2012, Mar. 15, 2002, 5 pages.
Mackenzie,"The Tactile Touchpad", In Proceedings of the ACM CHI Human Factors in Computing Systems Conference Available at: <http://citeseerx.ist.psu.edu/viewdoc/download?doi=10.1.1.150.4780&rep=rep1&type=pdf>, Mar. 22, 1997, 2 pages.
Manresa-Yee,"Experiences Using a Hands-Free Interface", In Proceedings of the 10th International ACM SIGACCESS Conference on Computers and Accessibility, retrieved from <http://dmi.uib.es/~cmanresay/Research/%5BMan08%5DAssets08.pdf> on Jun. 1, 2012, Oct. 13, 2008, pp. 261-262.

(56) References Cited

OTHER PUBLICATIONS

McLellan,"Eleksen Wireless Fabric Keyboard: a first look", Retrieved from: <http://www.zdnetasia.com/eleksen-wireless-fabric-keyboard-a-first-look-40278954.htm> on May 7, 2012, Jul. 17, 2006, 9 pages.
McPherson,"TouchKeys: Capacitive Multi-Touch Sensing on a Physical Keyboard", In Proceedings of NIME 2012, May 2012, 4 pages.
Miller,"MOGA gaming controller enhances the Android gaming experience", Retrieved from <http://www.zdnet.com/moga-gaming-controller-enhances-the-android-gaming-experience-7000007550/> on Nov. 20, 2012, Nov. 18, 2012, 9 pages.
Nakanishi,"Movable Cameras Enhance Social Telepresence in Media Spaces", In Proceedings of the 27th International Conference on Human Factors in Computing Systems, retrieved from <http://smg.ams.eng.osaka-u.ac.jp/~nakanishi/hnp_2009_chi.pdf> on Jun. 1, 2012, Apr. 6, 2009, 10 pages.
Piltch,"ASUS Eee Pad Slider SL101 Review", Retrieved from <http://www.laptopmag.com/review/tablets/asus-eee-pad-slider-sl101.aspx>, Sep. 22, 2011, 5 pages.
Post,"E-Broidery: Design and Fabrication of Textile-Based Computing", IBM Systems Journal, vol. 39, Issue 3 & 4, Jul. 2000, pp. 840-860.
Poupyrev,"Ambient Touch: Designing Tactile Interfaces for Handheld Devices", In Proceedings of the 15th Annual ACM Symposium on User Interface Software and Technology Available at: <http://www.ivanpoupyrev.com/e-library/2002/uist2002_ambientouch.pdf>, Oct. 27, 2002, 10 pages.
Purcher,"Apple is Paving the Way for a New 3D GUI for IOS Devices", Retrieved from: <http://www.patentlyapple.com/patently-apple/2012/01/apple-is-paving-the-way-for-a-new-3d-gui-for-ios-devices.html> on Jun. 4, 2012, Retrieved from: <http://www.patentlyapple.com/patently-apple/2012/01/apple-is-paving-the-way-for-a-new-3d-gui-for-ios-devices.html> on Jun. 4, 2012, Jan. 12, 2012, 15 pages.
Qin,"pPen: Enabling Authenticated Pen and Touch Interaction on Tabletop Surfaces", In Proceedings of ITS 2010, Available at <http://www.dfki.de/its2010/papers/pdf/po172.pdf>, Nov. 2010, pp. 283-284.
Reilink,"Endoscopic Camera Control by Head Movements for Thoracic Surgery", In Proceedings of 3rd IEEE RAS & EMBS International Conference of Biomedical Robotics and Biomechatronics, retrieved from <http://doc.utwente.nl/74929/1/biorob_online.pdf> on Jun. 1, 2012, Sep. 26, 2010, pp. 510-515.
Rendl,"PyzoFlex: Printed Piezoelectric Pressure Sensing Foil", In Proceedings of the 25th Annual ACM Symposium on User Interface Software and Technology, Oct. 7, 2012, 10 pages.
Staff,"Gametel Android controller turns tablets, phones into portable gaming devices", Retrieved from <http://www.mobiletor.com/2011/11/18/gametel-android-controller-turns-tablets-phones-into-portable-gaming-devices/#> on Nov. 20, 2012, Nov. 18, 2011, 5 pages.
Sumimoto,"Touch & Write: Surface Computing With Touch and Pen Input", Retrieved from: <http://www.gottabemobile.com/2009/08/07/touch-write-surface-computing-with-touch-and-pen-input/> on Jun. 19, 2012, Aug. 7, 2009, 4 pages.
Sundstedt,"Gazing at Games: Using Eye Tracking to Control Virtual Characters", In ACM SIGGRAPH 2010 Courses, retrieved from <http://www.tobii.com/Global/Analysis/Training/EyeTrackAwards/veronica_sundstedtpdf> on Jun. 1, 2012, Jul. 28, 2010, 85 pages.
Takamatsu,"Flexible Fabric Keyboard with Conductive Polymer-Coated Fibers", In Proceedings of Sensors 2011, Oct. 28, 2011, 4 pages.
Travis,"Collimated Light from a Waveguide for a Display Backlight", Optics Express, 19714, vol. 17, No. 22, retrieved from <http://download.microsoft.com/download/D/2/E/D2E425F8-CF3C-4C71-A4A2-70F9D4081007/OpticsExpressbacklightpaper.pdf> on Oct. 15, 2009, Oct. 15, 2009, 6 pages.
Travis,"The Design of Backlights for View-Sequential 3D", retrieved from <http://download.microsoft.com/download/D/2/E/D2E425F8-CF3C-4C71-A4A2-70F9D4081007/Backlightforviewsequentialautostereo.docx> on Nov. 1, 2010, 4 pages.
Valli,"Notes on Natural Interaction", retrieved from <http://www.idemployee.id.tue.nl/g.w.m.rauterberg/lecturenotes/valli-2004.pdf> on Jan. 5, 2012, Sep. 2005, 80 pages.
Valliath,"Design of Hologram for Brightness Enhancement in Color LCDs", Retrieved from <http://www.loreti.it/Download/PDF/LCD/44_05.pdf> on Sep. 17, 2012, May 1998, 5 pages.
Vaucelle,"Scopemate, A Robotic Microscope!", Architectradure, retrieved from <http://architectradure.blogspot.com/2011/10/at-uist-this-monday-scopemate-robotic.html> on Jun. 6, 2012, Oct. 17, 2011, 2 pages.
Williams,"A Fourth Generation of LCD Backlight Technology", Retrieved from <http://cds.linear.com/docs/Application%20Note/an65f.pdf>, Nov. 1995, 124 pages.
Xu,"Hand Gesture Recognition and Virtual Game Control Based on 3D Accelerometer and EMG Sensors", IUI'09, Feb. 8-11, 2009, retrieved from <http://sclab.yonsei.ac.kr/courses/10TPR/10TPR.files/Hane%20Gesture%20Recognition%20and%20Virtual%20Game%20Control%20based%20on%203d%20accelerometer%20and%20EMG%20sensors.pdf> on Jan. 5, 2012, Feb. 8, 2009, 5 pages.
Xu,"Vision-based Detection of Dynamic Gesture", ICTM'09, Dec. 5-6, 2009, retrieved from <http://ieeexplore.ieee.org/stamp/stamp.jsp?tp=&arnumber=5412956> on Jan. 5, 2012, Dec. 5, 2009, pp. 223-226.
Zhang,"Model-Based Development of Dynamically Adaptive Software", In Proceedings of ICSE 2006, Available at <http://www.irisa.fr/lande/lande/icse-proceedings/icse/p371.pdf>, May 20, 2006, pp. 371-380.
Zhu,"Keyboard before Head Tracking Depresses User Success in Remote Camera Control", In Proceedings of 12th IFIP TC 13 International Conference on Human-Computer Interaction, Part II, retrieved from <http://csiro.academia.edu/Departments/CSIRO_ICT_Centre/Papers?page=5> on Jun. 1, 2012, Aug. 24, 2009, 14 pages.
"International Preliminary Report on Patentability", Application No. PCT/US2016/031699, dated Feb. 22, 2017, 6 pages.
"International Search Report and Written Opinion", Application No. PCT/US2016/031700, dated Nov. 3, 2016, 20 pages.
"International Search Report and Written Opinion", Application No. PCT/US2016/031699, dated Nov. 11, 2016, 23 pages.
"Non-Final Office Action", U.S. Appl. No. 14/713,723, dated Jan. 30, 2017, 13 pages.
"Non-Final Office Action", U.S. Appl. No. 14/729,793, dated Mar. 31, 2017, 14 pages.
"Final Office Action", U.S. Appl. No. 14/713,723, dated Jul. 21, 2017, 19 pages.
"International Preliminary Report on Patentability", Application No. PCT/US2016/031700, dated Sep. 4, 2017, 13 pages.
"International Preliminary Report on Patentability", Application No. PCT/US2016/028191, dated Jul. 17, 2017, 8 pages.
"Non-Final Office Action", U.S. Appl. No. 14/713,723, dated Oct. 5, 2017, 21 pages.
"Second Written Opinion", Application No. PCT/US2016/031700, dated Jun. 27, 2017, 12 pages.
"Second Written Opinion", Application No. PCT/US2016/028191, dated Apr. 18, 2017, 7 pages.
Fischer D., "Capacitive Touch Sensors—Application Fields, Technology Overview and Implementation Example", In Proceedings of the Human Interfaces, vol. 4, Fujitsu Microelectronics Europe, Jan. 12, 2010, 12 Pages.
"Enhancing Your Device Design Through Tactile Feedback", Retrieved from https://web.archive.org/web/20110515005426/http://www.immersion.com/docs/Enhancing-Device-Design-Through-Tactile-Feedback.pdf, Apr. 2011, 7 Pages.
Blankenship T., "Tactile Feedback Solutions Using Piezoelectric Actuators", Maxim Integrated Products Inc., Nov. 17, 2010, 6 Pages.
"Final Office Action Issued in U.S. Appl. No. 13/655,065", dated Apr. 2, 2015, 23 Pages.
"Non-Final Office Action Issued in U.S. Appl. No. 13/655,065", dated Aug. 19, 2015, 18 Pages.

(56) References Cited

OTHER PUBLICATIONS

"Final Office Action Issued in U.S. Appl. No. 13/769,356", dated Apr. 10, 2015, 9 Pages.
"Non-Final Office Action Issued in U.S. Appl. No. 13/769,356", dated Nov. 20, 2014, 17 Pages.
"Final Office Action Issued in U.S. Appl. No. 13/782,137", dated May 8, 2015, 20 Pages.
"Non-Final Office Action Issued in U.S. Appl. No. 13/782,137", dated Oct. 6, 2015, 21 Pages.
"Non-Final Office Action Issued in U.S. Appl. No. 13/782,137", dated Jan. 30, 2015, 14 Pages.
"Final Office Action Issued in U.S. Appl. No. 13/974,749", dated May 21, 2015, 20 Pages.
"Final Office Action Issued in U.S. Appl. No. 13/974,994", dated Jun. 10, 2015, 28 Pages.
"Final Office Action Issued in U.S. Appl. No. 13/975,087", dated Aug. 7, 2015, 16 Pages.
"Non-Final Office Action Issued in U.S. Appl. No. 14/033,508", dated Dec. 3, 2015, 15 Pages.
"Final Office Action Issued in U.S. Appl. No. 14/033,510", dated Jun. 5, 2015, 25 Pages.
"Non-Final Office Action Issued in U.S. Appl. No. 14/033,510", dated Oct. 7, 2015, 24 Pages.
"Non-Final Office Action Issued in U.S Appl. No. 14/144,876", dated Jun. 10, 2015, 24 Pages.
"Final Office Action Issued in U.S. Appl. No. 14/591,704", dated Nov. 25, 2016, 33 Pages.
"Non-Final Office Action Issued in U.S. Appl. No. 14/591,704", dated Mar. 10, 2017, 26 Pages.
"Non-Final Office Action Issued in U.S. Appl. No. 14/591,704", dated Jun. 7, 2016, 34 Pages.
"Final Office Action Issued in U.S. Appl. No. 14/729,793", dated Dec. 1, 2017, 17 Pages.
"Non Final Office Action Issued in U.S. Appl. No. 14/729,793", dated Jul. 30, 2018, 17 Pages.
"Non Final Office Action Issued in U.S. Appl. No. 15/269,594", dated Jun. 7, 2017, 27 Pages.
"Non-Final Office Action Issued in U.S. Appl. No. 15/283,913", dated Feb. 10, 2017, 20 Pages.
Hughes, Neil, "Apple's Haptic Touch Feedback Concept Uses Actuators, Senses Force on iPhone, iPad", Retrieved from https://appleinsider.com/articles/12/03/22/apples_haptic_touch_feedback_concept_uses_actuators_senses_force_on_iphone_ipad, Mar. 22, 2012, 5 Pages.
Kyung, et al., "TAXEL: Initial Progress Toward Self-Morphing Visio-Haptic Interface", In Proceedings of the IEEE Conference on World Haptics, Jun. 21, 2011, pp. 37-42.
"International Search Report & Written Opinion Issued in PCT Application No. PCT/US2014/016151", dated May 16, 2014, 10 Pages.
"International Search Report & Written Opinion Issued in PCT Application No. PCT/US2014/016743", dated Jul. 24, 2014, 10 Pages.
"Second Written Opinion Issued in PCT Application No. PCT/US2014/056185", dated Sep. 15, 2015, 5 Pages.
"International Search Report and Written Opinion Issued in PCT Application No. PCT/US2014/068687", dated Mar. 18, 2015, 10 Pages.
"International Preliminary Report on Patentability Issued in PCT Application No. PCT/US2015/067754", dated Jan. 10, 2017, 10 Pages.
"International Search Report and Written Opinion Issued in PCT Application No. PCT/US2015/067754", dated Apr. 7, 2016, 13 Pages.
"Second Written Opinion Issued in PCT Application No. PCT/US2015/067754", dated Nov. 25, 2016, 8 Pages.
"International Preliminary Report on Patentability Issued in PCT Application No. PCT/US2016/025966", dated May 22, 2017, 8 Pages.
"International Search Report and Written Opinion Issued in PCT Application No. PCT/US2016/025966", dated Jun. 15, 2016, 15 Pages.
"Second Written Opinion Issued in PCT Application No. PCT/US2016/025966", dated Mar. 14, 2017, 7 Pages.
Poupyrev, et al., "Tactile Interfaces for Small Touch Screens", In Proceedings of the 16th Annual ACM Symposium on User Interface Software and Technology, Nov. 2, 2003, pp. 217-220.
Titus, Jon, "Give Sensors a Gentle Touch", Retrieved from https://www.ecnmag.com/article/2010/01/give-sensors-gentle-touch, Jan. 13, 2010, 6 Pages.
Tuite, Don, "Haptic Feedback Chips Make Virtual-Button Applications on Handheld Devices a Snap", In Proceedings of the Electronic Design, vol. 57, Issue 18, Sep. 10, 2009, 2 Pages.
"Non-Final Office Action Issued in U.S. Appl. No. 13/769,356", dated Oct. 19, 2015, 24 Pages.

\* cited by examiner

FORCE INPUTS AND CURSOR CONTROL

BACKGROUND

Detection of touch inputs may be utilized to support a variety of functionality. For example, trackpads may be found on a variety of different devices to support cursor control and gestures, such as on a laptop, removable keyboard cover for a tablet, and so on. In some instances, the trackpads also include functionality usable to initiate a selection (e.g., a "click") and thus movement of a cursor and selections may be made by a user without requiring a user to remove a finger from the trackpad to press a separate button. Touch functionality may also be included in a variety of other devices, such as part of a touchscreen of a mobile phone or tablet, keyboard sensor array, and so on.

In some instances, however, a user may inadvertently provide a touch input, which could interfere with the user's experience. For example, a user may type on a keyboard and "hover" a finger over the trackpad, which may then result in an inadvertent tap due to fatigue, being jostled, and so forth. In the case of composing a document, this may cause a cursor to be moved elsewhere in the document. If the user does not notice this movement, the typing may continue at that point, which may be frustrating. These frustrations may also be encountered in other situations, such as when browsing the Internet, composing a drawing, and so forth.

SUMMARY

Inadvertent input control techniques are described. In one or more implementations, techniques are described that leverage detection of applied force to determine a likelihood that a user intended to provide an input, e.g., a selection input (e.g., a "click"), gesture, lift off, and so forth. This is usable to identify taps, hovers (e.g., noncontacts or contacts that are viewed at a level below a threshold), continuation of movement of a drag operation, and so on. Implementations are also discussed that leverage a curve, surface or n-manifold in a product space of contact size and signal strength that is usable to define a likelihood of whether a contact includes an application of force. A variety of other examples are also described, including cursor stability techniques that leverage force in order to control movement of a cursor.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items. Entities represented in the figures may be indicative of one or more entities and thus reference may be made interchangeably to single or plural forms of the entities in the discussion.

DETAILED DESCRIPTION

Overview

Inadvertent inputs captured by touch-enabled devices may interfere with a user's experience when interacting with the devices. This may cause inadvertent selections, unintended movement of a cursor, erroneous gestures, and so forth which may be frustrating to the user.

Inadvertent input control techniques are described. In one or more implementations, force is utilized at least in part to determine a likelihood that a user intended to provide an input. In a first example, a force waveform is used to determine whether a tap is intended by a user. In a second example, a force waveform is used to determine a likelihood of whether an input detected by position sensors (e.g., by capacitive sensors) is intended by a user through verifying whether force is detected by force sensors. In a third example, contacts are ignored that occur after long-duration hovers as the likelihood is greater that a user intended to hover a finger over a trackpad than wanting to initiate the input.

Cursor stability techniques are also described. In one or more examples, force is used to cause a cursor to remain stable, such as for a press-down or lift-off of an object from a trackpad. This may be performed through detection of an amount of force, used to reduce cursor velocity gain, and so on. In this way, the effect of movements of centroids of a contact region caused by a press or release may be minimized.

Techniques are also described in which an amount of force is inferred from a position sensor without use of a dedicated force sensor. Values of a contact size (e.g., area) and signal strength (e.g., amplitude) from position sensors (e.g., capacitive sensors, sensor-in-a-pixel configurations, and so on) are compared to a curve, surface or (in general) n-manifold defined in a product space of contact size and signal strength that is usable to detect a prescribed amount of force applied to the outer surface of the position sensors. A product space is a Cartesian product of a family of topological spaces equipped with a natural topology called a product topology. For example, points above the n-manifold are considered indicative of force and points below the n-manifold are not, resulting in a zero force n-manifold. Thus, the n-manifold is also usable to determine a likelihood that a user intended to initiate an input, maintain an input (e.g., as part of a select-and-drag operation), and so forth. Further discussion of these and other examples is included in the following sections.

In the following discussion, an example environment is first described that may employ the techniques described herein. Example procedures are then described which may be performed in the example environment as well as other environments. Consequently, performance of the example procedures is not limited to the example environment and the example environment is not limited to performance of the example procedures as further described below.

Example Environment

Figure 1:
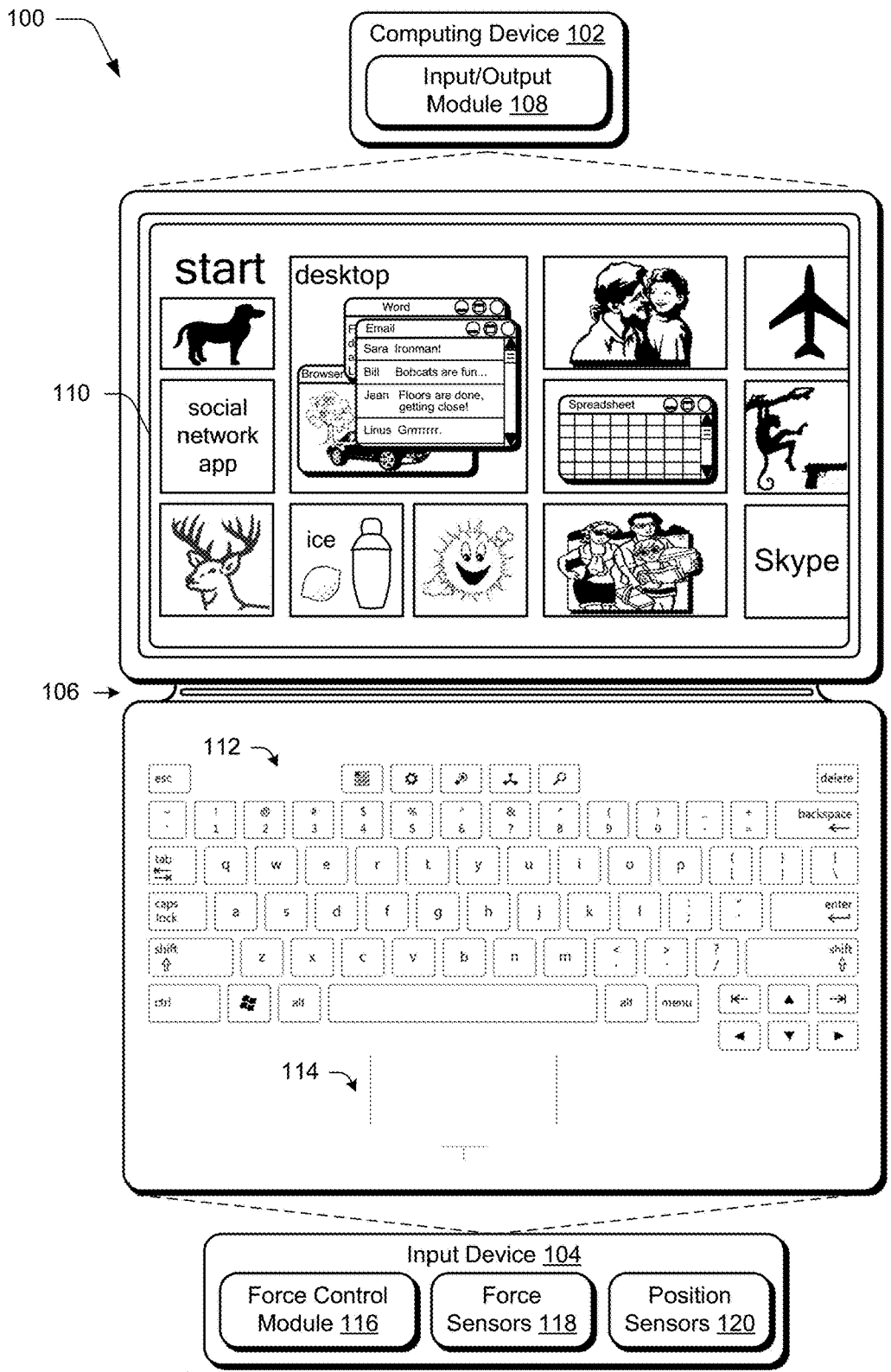
FIG. 1 is an illustration of an environment in an example implementation that is operable to employ the inadvertent input control techniques described herein.

FIG. 1 is an illustration of an environment 100 in an example implementation that is operable to employ the inadvertent input control techniques described herein. The illustrated environment 100 includes an example of a computing device 102 that is physically and communicatively coupled to an input device 104 via a flexible hinge 106. The computing device 102 may be configured in a variety of ways. For example, the computing device 102 may be configured for mobile use, such as a mobile phone, a tablet computer as illustrated, and so on. Thus, the computing device 102 may range from full resource devices with substantial memory and processor resources to a low-resource device with limited memory and/or processing resources. The computing device 102 may include software that causes the computing device 102 to perform one or more operations.

The computing device 102, for instance, is illustrated as including an input/output module 108. The input/output module 108 is representative of functionality relating to processing of inputs and rendering outputs of the computing device 102. A variety of different inputs may be processed by the input/output module 108, such as inputs relating to functions that correspond to keys of the input device 104, keys of a virtual keyboard displayed by the display device 110 to identify gestures and cause operations to be performed that correspond to the gestures that may be recognized through the input device 104 and/or touchscreen functionality of the display device 110. Thus, the input/output module 108 may support a variety of different input techniques by recognizing and leveraging a division between types of inputs including key presses, gestures, and so on.

In the illustrated example, the input device 104 is configured as having an input portion that includes a keyboard 112 having a QWERTY arrangement of keys and a track pad 114, although other arrangements of keys are also contemplated. Further, other non-conventional configurations are also contemplated, such as a game controller, a configuration to mimic a musical instrument, and so forth. Thus, the input device 104 and keys incorporated by the input device 104 may assume a variety of different configurations to support a variety of different functionality.

As previously described, the input device 104 is physically and communicatively coupled to the computing device 102 in this example through use of a flexible hinge 106. The flexible hinge 106 is flexible in that rotational movement supported by the hinge is achieved through flexing (e.g., bending) of the material forming the hinge as opposed to mechanical rotation as supported by a pin (although that embodiment is also contemplated). Further, this flexible rotation may be configured to support movement in one or more directions (e.g., vertically in the figure) yet restrict movement in other directions, such as lateral movement of the input device 104 in relation to the computing device 102. The flexible hinge 106 may be used to support consistent alignment of the input device 104 in relation to the computing device 102, such as to align sensors used to change power states, application states, and so on.

The flexible hinge 106 may be formed using one or more layers of fabric and include conductors formed as flexible traces to communicatively couple the input device 104 to the computing device 102 and vice versa. This communication may be used to communicate a result of a key press to the computing device 102, receive power from the computing device, perform authentication, provide supplemental power to the computing device 102, and so on.

Figure 12:
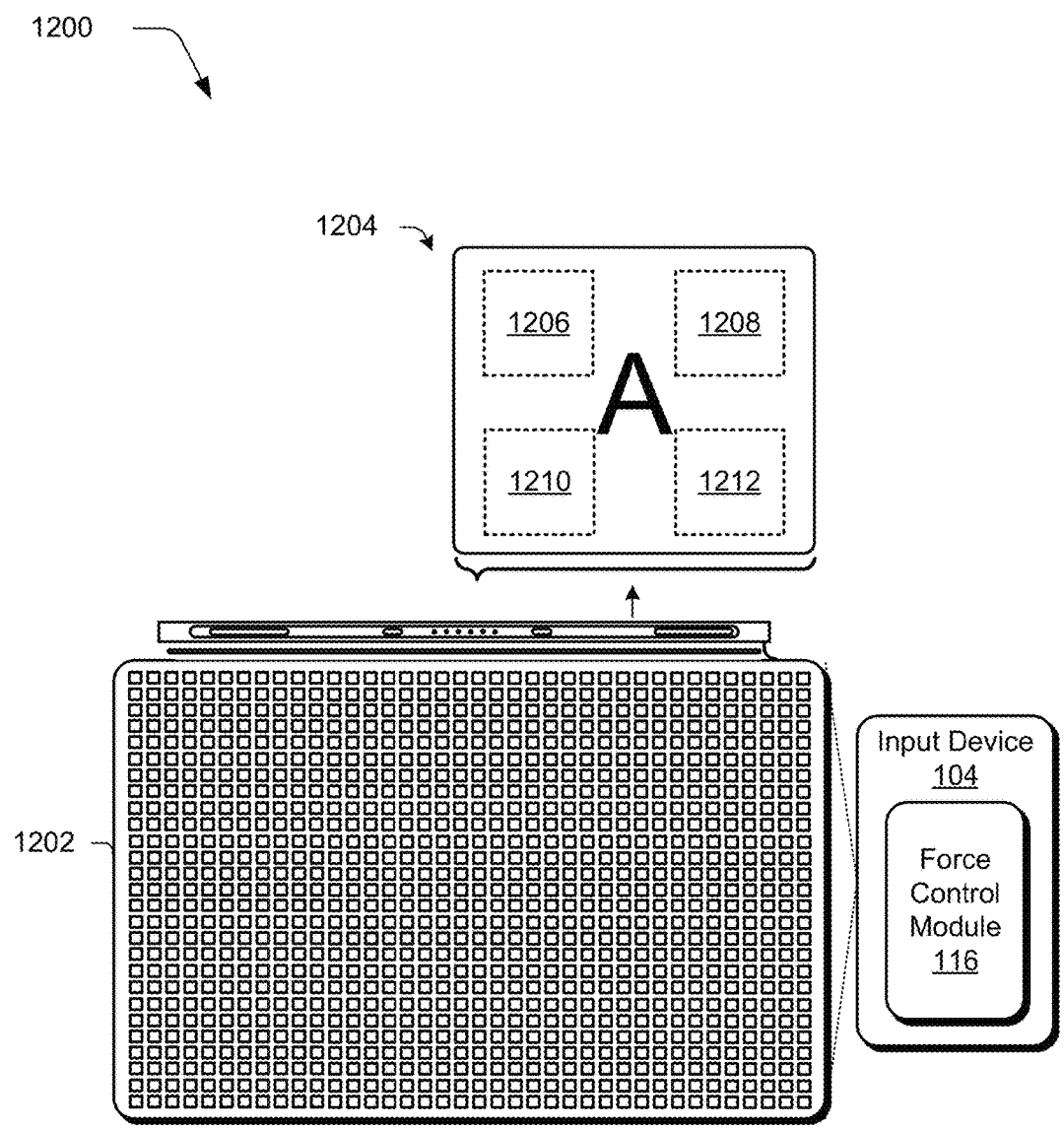
FIG. 12 depicts a system in an example implementation usable to employ techniques regarding force curves and inadvertent input control.

The input device is also illustrated as including a force control module 116 that is representative of using force control techniques to manage inadvertent and advertent inputs. The input device 104, for instance, may include force sensors 118 and position sensors 120. Force sensors 118 are configurable in a variety of ways, such as through use of piezos, force sensitive resistors, strain gauges, and so forth. Force sensors are usable to provide a single indication of force summing of all contact forces or provide a technique to calculate an amount of force on a per sensor force reading. Position sensors 120 are configured to detect a relative location of an object, such as a finger of a user's hand, to control movement of a cursor, input gestures, and so forth. The force sensors 118 and position sensors 120 may be configured in a variety of ways for inclusion in a variety of devices, such as part of the trackpad 114, keys of a keyboard arranged in a sensor array as shown in FIG. 12, as part of touchscreen functionality of the display device 110, and so forth. Accordingly, although trackpad implementations are described in the following discussion, these implementations are equally applicable to other device and usage scenarios.

Figure 2:
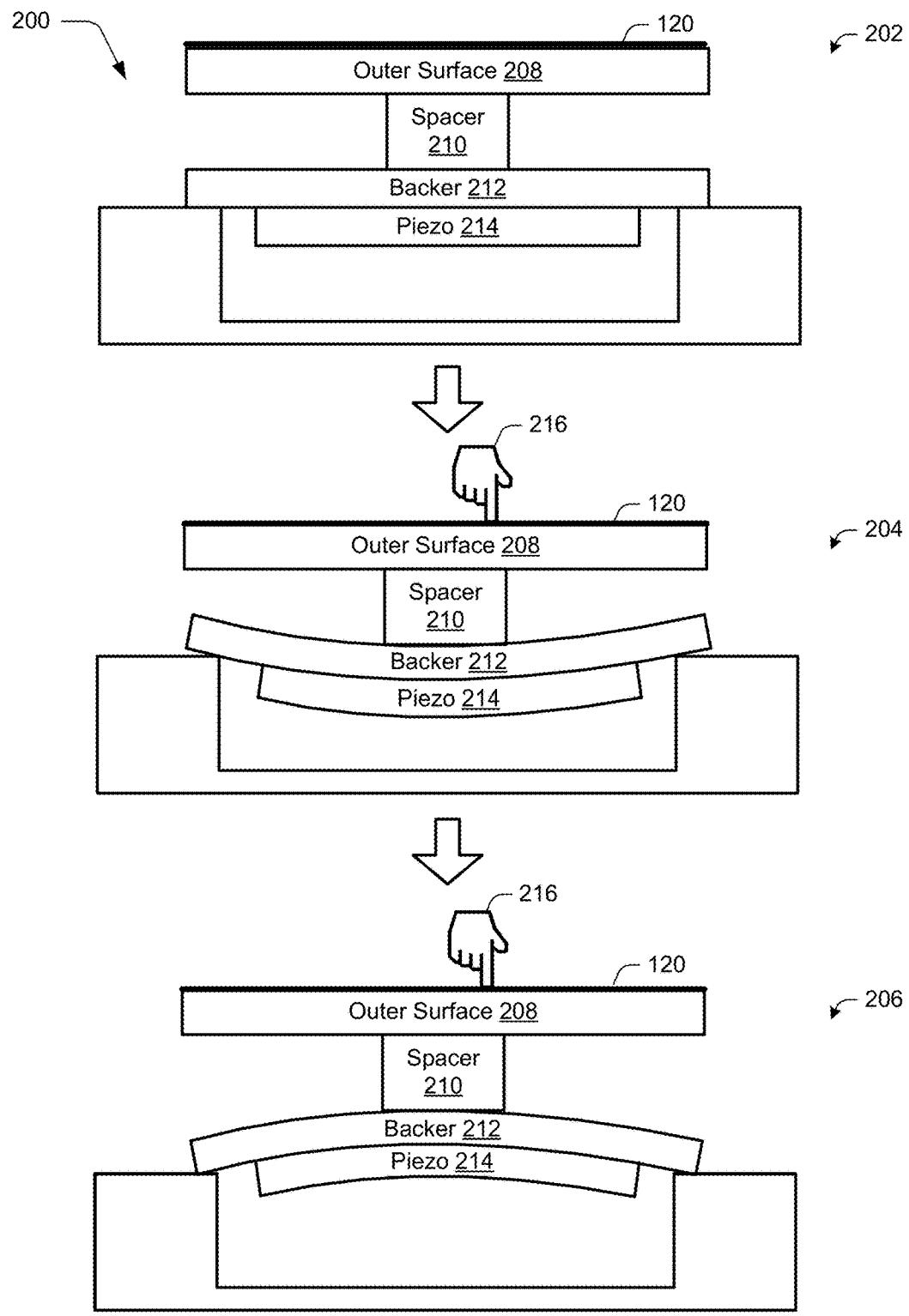
FIG. 2 depicts an example of a force sensor that includes a haptic feedback mechanism employing piezos to detect force and provide haptic feedback and a position sensor usable to detect a relative location of an object.

FIG. 2 depicts an example 200 of a force sensor 118 employing piezos to detect force and provide haptic feedback and a position sensor 120 usable to detect a relative location of an object. This example is illustrated using a first stage 202, a second stage 204, and a third stage 206. The mechanism includes an outer surface 208, such as the surface of a trackpad or the key of a keyboard. The outer surface 208 may be formed from a variety of different materials and combinations thereof, such as glass, plastic, a laminate structure, and a fabric outer layer.

The outer surface 208 includes the position sensors 120 of FIG. 1 that are configured to detect a relative location of an object in relation to the outer surface 208. The position sensors 120 may be formed from a variety of different sensor types, such as capacitive sensors (e.g., a capacitive array), sensor-in-a-pixel, optical sensors, resistive sensors, and acoustic sensors.

The outer surface 208 is coupled mechanically to a spacer 210 that is coupled mechanically to a backer 212. The spacer 210 is configured to channel force applied to the outer surface 210 to a central region of the backer 212 and thus to a piezo 214 connected thereto. In this way, an amount of deflection of the backer 212 and the corresponding piezo 214 is increased in response to the force, even on "off center" presses, thereby supporting a greater sensitivity to detection of an amount of force and haptic response.

The backer 212 is formed from a rigid material (e.g., steel, plastic, and the like) and is physically coupled to the piezo 214. Accordingly, as illustrated in the first stage 202, when a force is not applied to the outer surface 208 (and thus no force is applied to the backer 212), the piezo 214 is not strained and as such does not output a voltage.

At the second stage 204, an object 216 such as a finger of a user's hand (not shown in scale) applies a force as part of pressing down on the outer surface 216) that causes deflection of the backer 212 and thus strain on the piezo 214, resulting in an output voltage that is detectable by the force sensing and haptic feedback module 116. As the voltage output by the piezo 214 changes with an amount of force applied, the piezo 214 is configured to detect not just the presence or absence of force, but also an amount of force, e.g., a respective one of a plurality of levels of force. The piezo 214 is configurable in a variety of ways, such as being formed at least in part from a piezo ceramic material, PZT, an electroactive polymer, or an electromechanical polymer.

The piezo 214 is also usable to provide a haptic feedback, as shown at the third stage 206. Continuing with the previous example in the second stage 204, the piezo 214 detects an amount of force applied to the outer surface 208 by the finger of the user's hand. If the detected force is over a threshold, the force control module 116 energizes the piezo 214. This causes the piezo 214 to pull against the backer 212 and thus deflect outward back toward the object 216 applying the force, thereby providing a haptic response.

In this way, the piezo 214 is leveraged to provide both force sensing and haptic feedback. Other examples are also contemplated. For instance, force may be sensed by a force sensor that is not the piezo and then the piezo may be used to provide haptic feedback. In another instance, a first piezo may be used to detect force and a second piezo may be used to provide haptic feedback. As described above, force sensors 118 are also configurable without piezos while not departing from the spirit and scope of the techniques described herein.

Force Sensing and Inadvertent Input Control

Figure 3:
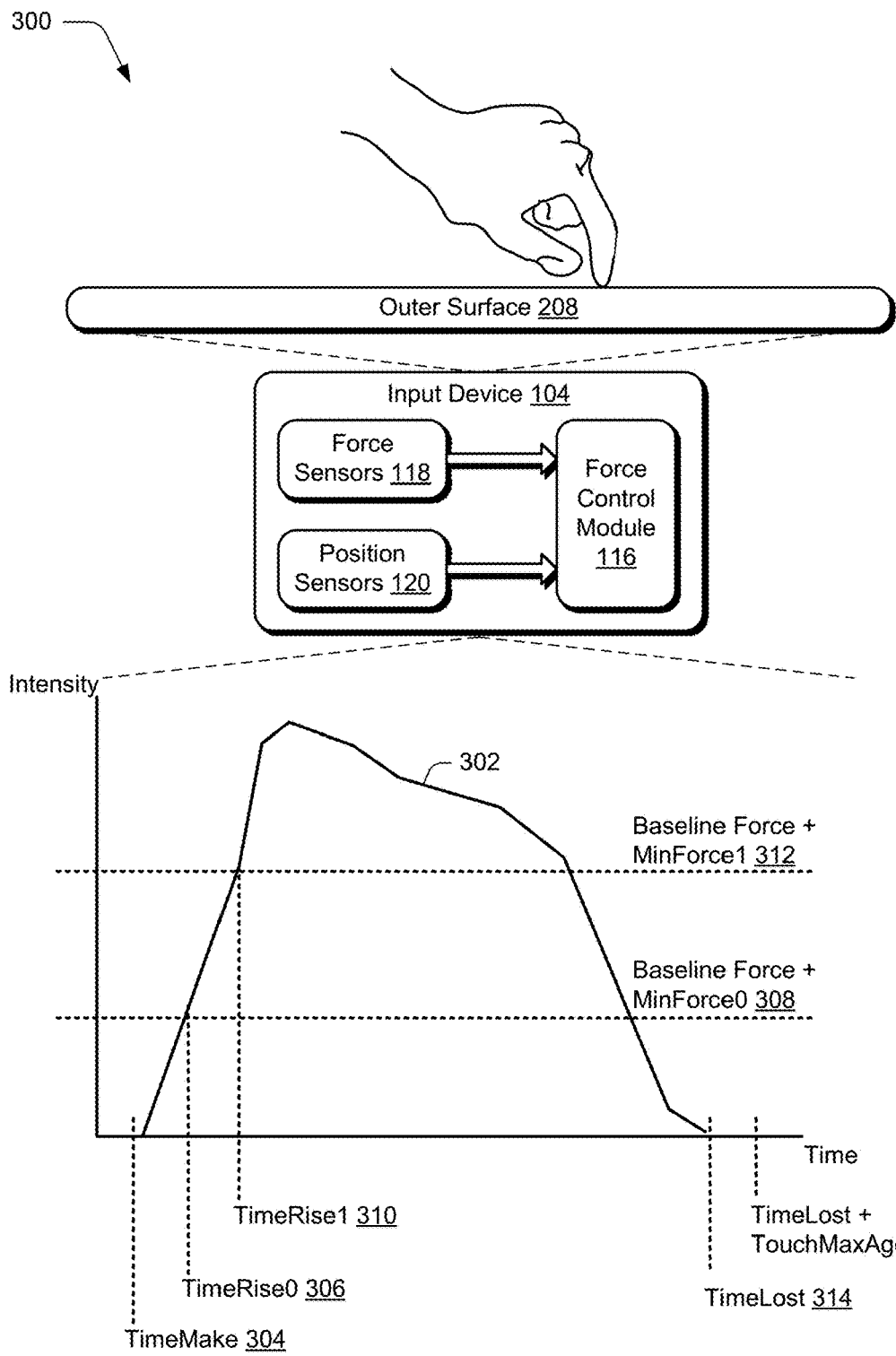
FIG. 3 depicts a system in an example implementation showing inadvertent input control for selection inputs by a force control module.

FIG. 3 depicts a system 300 in an example implementation showing inadvertent input control for selection inputs by a force control module 116. A selection input may be thought of as a brief light tap on the outer surface 208 of an input device (e.g., trackpad), which in some instances is not strong enough to trigger a haptic response as described in relation to FIG. 2. Other examples of a selection input are also contemplated in which a "press" is controlled, such as a selection input that has sufficient strength to initiate a click and haptic response, e.g., as a button press of a mouse.

In this example, the force control module 116 is configured to control results of inadvertent inputs through use of a force signature 302 that is expressed as a waveform formed by reports obtained by the force control module 116 from the force sensors 118. The force control module 116 is configured to block further communication of reports from the force sensors 118 and the position sensors 120 that do not meet criteria for an input, e.g., repressing the associated contact such that a touch detection is not reported to the computing device 102, marking the contact as invalid (e.g., by clearing a confidence bit), and so on.

The force control module 116 obtains reports from the force sensors 118 that sample force readings continuously at a sampling rate. In one or more implementations, the reports (e.g., readings) are spaced-out by no more than one or two milliseconds. An exception may be made for simpler parameter extraction, such as to judge simple presence to distinguish from hovering. In those cases it may be permissible to sample at an even slower rate. The reports may be maintained by the force control module 116 in a buffer, such as a circular buffer, to hold approximately fifty milliseconds worth of samples.

A check is first made by the force control module 116 for proper operating conditions, such as to start with zero contacts on the trackpad for cases involving single taps. The force control module 116 waits for an indication of detection of a contact (e.g., a finger of the user's hand in the illustrated example) to arrive. There may be a delay between contact (e.g., a finger touching down) and a controller of the position sensors 120 reporting the contact. The delay may be caused by a limited frame rate of the position sensors 120 (e.g. 8 ms), noise filtering performed by the controller, and so on.

Accordingly, a leading edge of the waveform of the force signature 302 associated with a new contact by the force sensors 118 generally precedes the report from the position sensors 120. This delay is generally variable, typically varying from between five and fifteen milliseconds. When a report arrives from the position sensors 120, force reports are fetched backwards in time (e.g., up to about 15 ms) from the cache by the force control module 116 to ensure that the leading edge of the waveform of the force signature 302 is captured.

Once the force signature 302 is captured, the force control module 116 first locates a leading edge in the waveform. As discussed above, there may be some uncertainty about where this leading edge is found. Parameters from the waveform are then extracted as described below, such as a slope of leading edge and a magnitude (e.g., maximum height).

If the force signature 302 appears to satisfy an intentional selection input (e.g., a "tap"), the force control module 116 is configured to register and permit communication of this information to the input/output module 108 of the computing device 102. Thus, the computing device 102 may also make conclusions about whether the reports reflect an intentional input.

If the force signature 302 does not have a likelihood of being intentional, a variety of different actions may be performed. The force control module 116, for instance, may indicate this lack of confidence to the computing device 102. The input/output module 108 of the computing device 102 is then free to make determinations, e.g., the force signature 302 may still be treated as an intentional selection input. Other examples are also contemplated, such as to block further communication of the reports by the force control module 116 and/or input/output module 108 from proceeding onward, e.g., to the operating system or applications as inputs.

In one or more implementations, the force control module 116 is configured to monitor the contact to decide whether the contact would be interpreted by the computing device 102 as a selection input, e.g., as a tap. For example, if the contact is lifted at no more than 300 milliseconds later, then the force control module 116 is aware that the reports will be interpreted as a tap by the computing device 102. Accordingly, when the object is lifted from the outer surface 208, the confidence bit that asks the computing device 102 to repress the tap is cleared by the force control module 116.

The force control module 116 calculates a force baseline by averaging an initial plurality of the reports of the force signature 302. A rise in force is located in the force signature 302 over the baseline that meets a defined minimum value. As shown in FIG. 3, for instance, TimeMake 304 marks the beginning of the force signature 302.

The force control module 116 then locates and records a first time (e.g., TimeRise0 306) at which the amount of force in the force signature 302 reaches a first threshold value, e.g., BaselineForce plus MinForce0 308. The force control module 116 also locates and records a second time (e.g., TimeRise1 310) at which the amount of force in the force signature 302 reaches a second threshold value, e.g., BaselineForce plus MinForce1 312, which is greater than the first threshold value. A rise time is then calculated based on the recorded first and second times, e.g., TimeRise0 306 and TimeRise1 310, and thus a slope of the leading edge of the force signature 302 is known.

The force control module 116 then reviews the recorded first time to ensure that the value does not exceed a defined maximum value. The force control module 116 also reviews the slope of the attack of the leading edge of the waveform of the force signature 302 to ensure the slope meets a defined minimum threshold. If so, the force control module 116 determines that it is likely that the force signature 302 represents a valid selection input, e.g., a tap, click, and so forth. Likewise, if the slope does not meet the defined minimum threshold, the force control module 116 may determine that it is likely that the force signature 302 does not represent a valid selection input.

Figure 4:
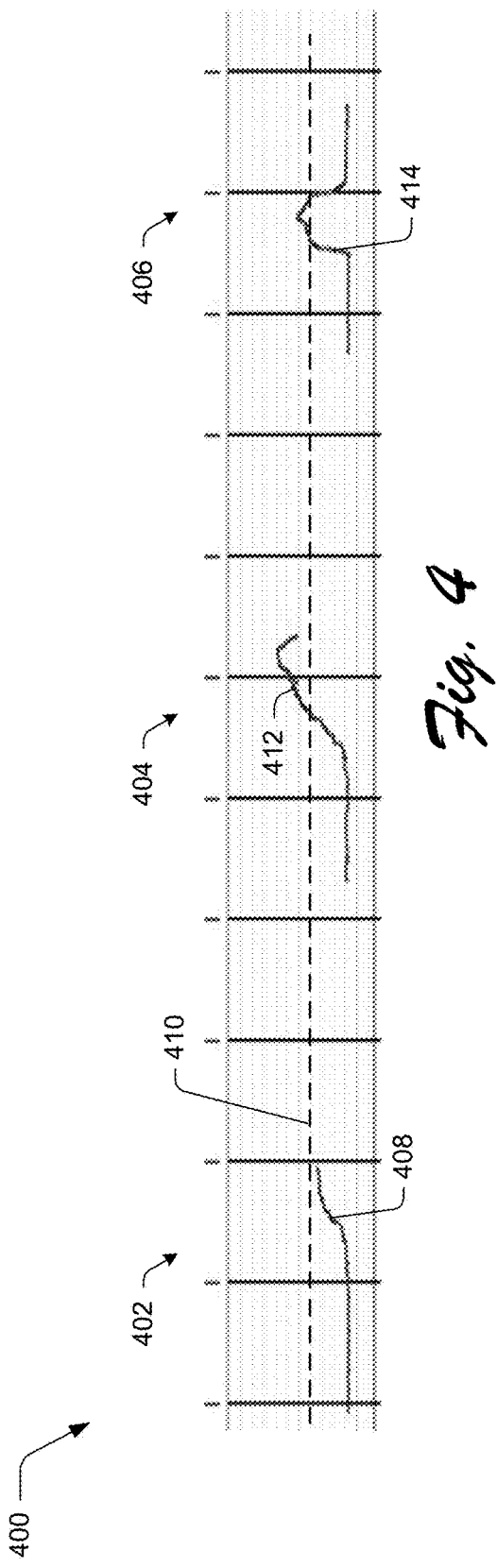
FIG. 4 depicts an implementation showing first, second, and third examples of force signatures expressed as waveforms.

FIG. 4 depicts an implementation 400 showing multiple examples of force signatures expressed as waveforms. In the first example 402, the slope 408 is greater than the defined minimum threshold but the magnitude 410 has not reached the first threshold level, and therefore the force control module 116 determines that the detected object is not likely intended as a selection input. In the second example 404, the magnitude 410 has reached the first threshold level but the slope 412 is not greater than the defined minimum threshold, and therefore the force control module 116 determines that the detected object is not likely intended as a selection input. In the third example 406, the slope 414 is greater than the defined minimum threshold and the magnitude 410 has reached the first threshold level so the force control module 116 determines that the detected object likely involves an intended input.

In one or more implementations, the force control module 116 employs different modes to control determination of inadvertent inputs. The modes in the following refer to the system's inference of how a user is interacting with the input device 104 and/or the computing device 102 as a whole and define sets of parameters for the force control module 116 to determine the likelihood of an intentional input, e.g., the time and force parameters noted above. These parameters may be dynamic, providing greater or lesser defenses against taps, to provide the greatest defenses without imposing undo reductions in tap responsiveness.

In one example, the force control module 116 reverts to a "hard mode" when key presses are not detected or when the force control module 116 detects a prolonged period of input device disuse. In this way, difficulty in registering selection inputs is increased for situations in which it is suspected that the user is not using the trackpad. In the hard mode, the slope and force requirements are more stringent and thereby involve more clearly deliberate taps than when in an "easy mode." Following this example, the force control module 116 may switch to the easy mode when a hard tap occurs in the hard mode, when the user moves a cursor a minimum distance, and so on. When the cursor is moved, for instance, the force control module 116 may be fairly certain that the user intends to interact with the trackpad and thus the defenses against inadvertent inputs (e.g., slope and magnitude) are lowered in the easy mode.

Figure 5:
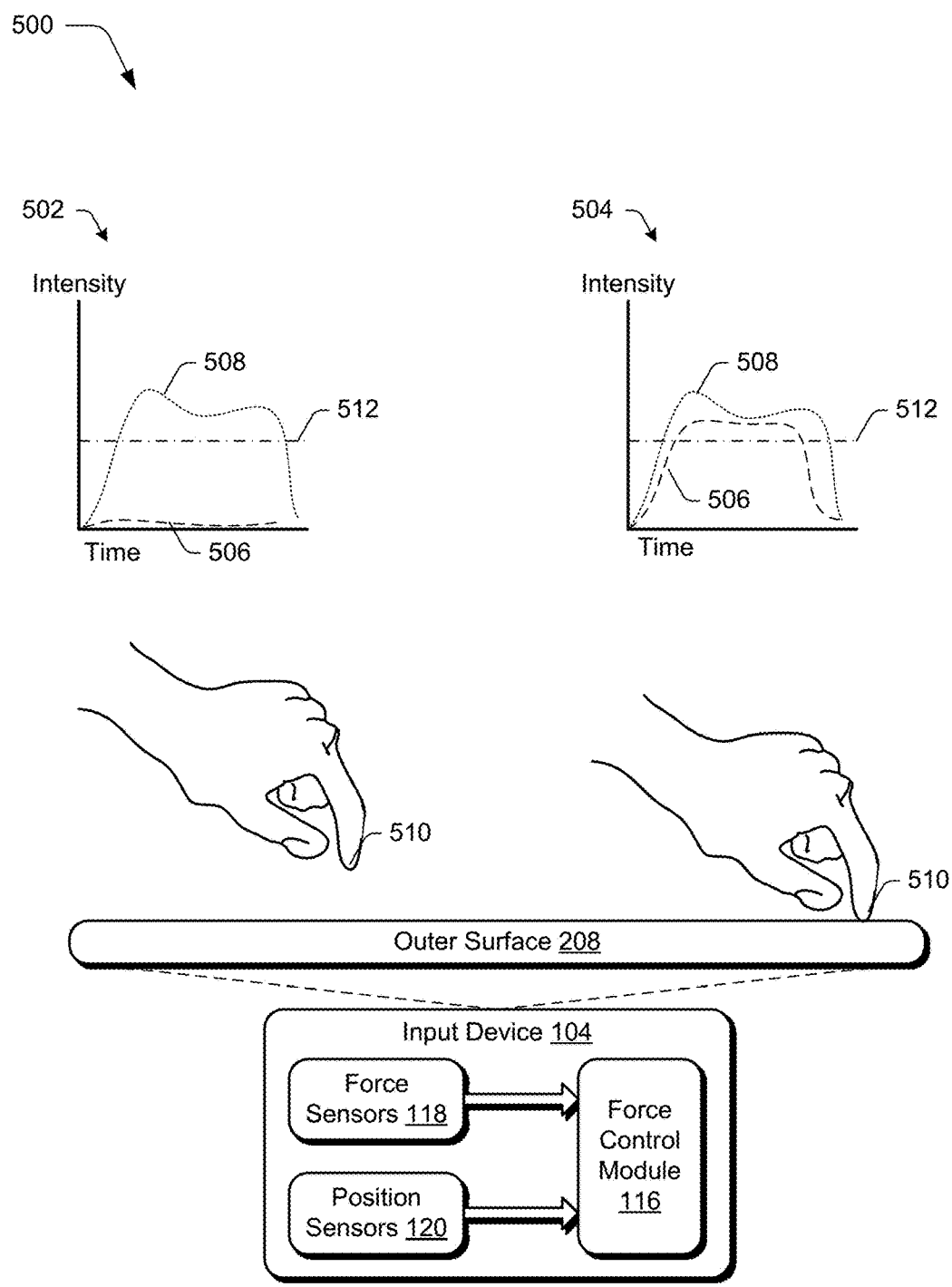
FIG. 5 depicts an example implementation of control of an inadvertent input involving a hover.

FIG. 5 depicts an example implementation 500 of control of an inadvertent input involving a hover. A hover inadvertent input typically occurs when a nearby object, such as a finger, thumb, or palm, is interpreted as intentional interaction by the input device 104. Accordingly, following the example above, the force control module 116 is configured to ignore contacts having force signatures 302 (e.g., waveforms) that do not meet prescribed criteria (e.g., force signatures 302 indicating hover inadvertent inputs).

The illustration includes a first example 502 and a second example 504. At the first example 502, reports from force sensors 118 form a waveform 506 and reports from position sensors 120 form a waveform 508. The waveform 508 from the position sensors 120 indicates that proximity of an object (e.g., a finger 510 from a user's hand) is detected. This proximity is detected without involving contact of the object with the outer surface 208, e.g., due to enhanced sensing range of capacitive sensors, infrared sensors, and so on.

However, the waveform 506 from the force sensors 118 indicates that minimal to no force is sensed by the force sensors 118, e.g., the magnitude of the waveform 506 is below a defined minimum force threshold 512. Therefore, in the first example 502 the force control module 116 readily determines that there is little to no likelihood of a user intending to initiate an input and responds accordingly, e.g., blocks communication of the reports from the position sensors 120 to the computing device 102, through use of a confidence bit.

In the second example 504, reports received by the force control module 116 from the position sensors 120 indicate proximity of the object (e.g., the finger 510 of the user's hand) through waveform 508. The waveform 508 formed from the reports received from the force sensors 118 also indicates that a force has been received that is above the minimum force threshold 512, and thus the object has contacted and applied the force to the outer surface 208. In response, the force control module 116 determines that it is likely that an input is intended, and responds accordingly as described above, e.g., communicates the reports to the input/output module 108 of the computing device 102 of FIG. 1. Thus, in this example the force control module 116 leverages force to distinguish between a deliberate contact and a hovering force.

Figure 6:
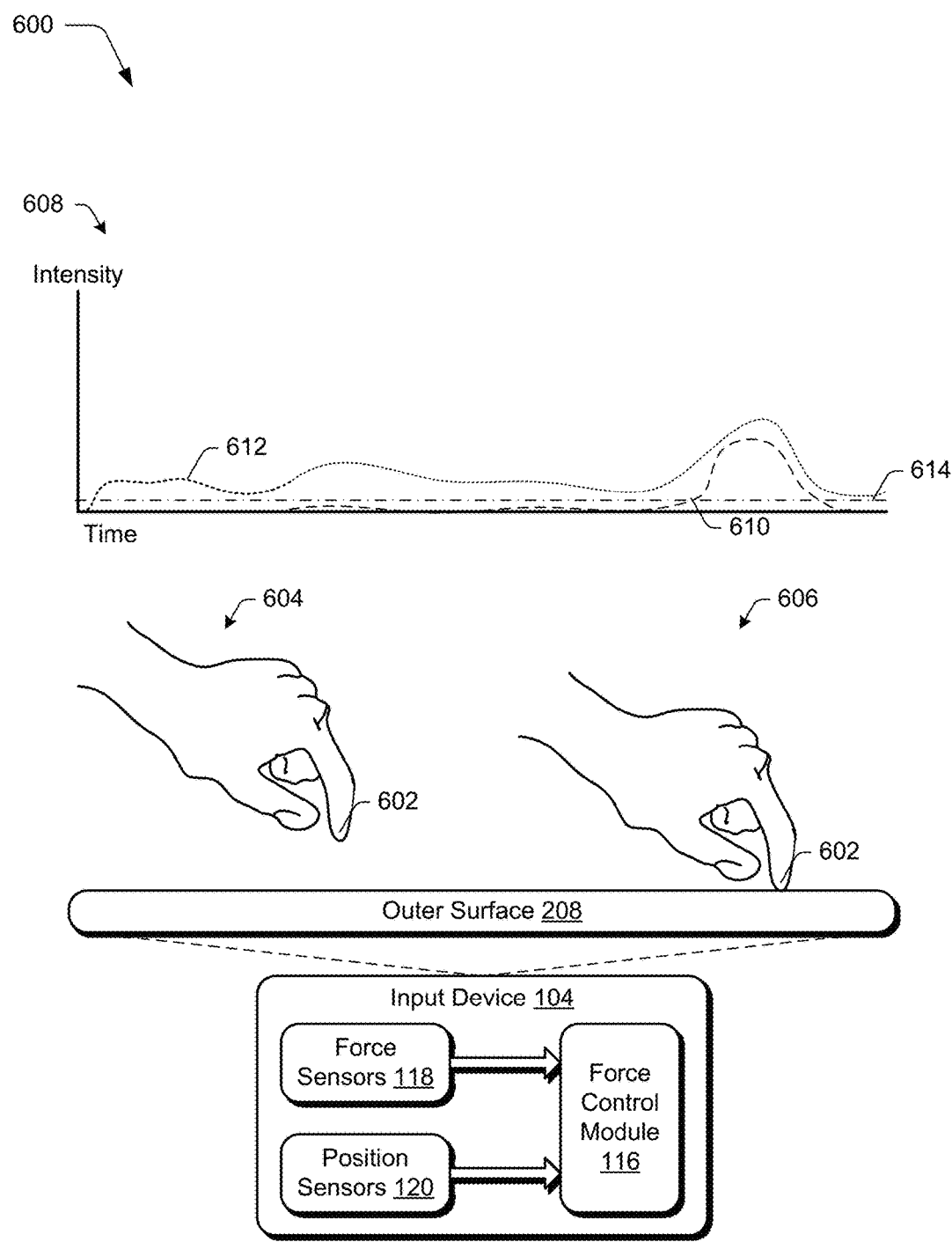
FIG. 6 depicts an example implementation of control of an inadvertent input involving a long-duration hover.

FIG. 6 depicts an example implementation 600 of control of an inadvertent input involving a long-duration hover. One type of inadvertent input involves unwanted contact (e.g., causing a tap, cursor movement, scrolling, zooming) caused by a user's hand 602 that was hovering over a trackpad. The user may have been typing and had a thumb or palm disposed proximal to the position sensors 120 that is consequently detected by the position sensors 120, but is not in contact with the outer surface 208.

In this example, reports of detected amounts of force from the force sensors 118 are used by the force control module 116 to determine that a significant force above a threshold 614 has not been applied (as shown at example 604), and thus contact was not likely made with the outer surface 208. If a contact is subsequently detected (as shown at example 606), the force control module 116 determines the likelihood of intent to initiate an input based on an amount of time the object spent hovering above the outer surface. In this way, the force control module 116 may leverage a realization that deliberate interactions with the trackpad usually do not start out with the user hovering for an extended period of time, but rather a user typically just moves in and interacts with the trackpad, e.g., to perform clicks, drags, gestures, and so on.

This is also illustrated graphically 608 in the figure in which a waveform 610 formed from reports from the force sensors 118 and a waveform 612 formed from reports from the position sensors 120 is shown. As illustrated by the first example 604 of a hover, the waveform 612 from the position sensors 120 does detect proximity but the waveform 610 from the force sensors 118 does not and thus the reports are ignored, e.g., blocked from further processing by the force control module 116.

A period of time progresses in this state, until an application of force to the outer surface 208 is detected by the force sensors 118 (as indicated at example 606) for the waveform 612 and proximity is also detected by the position sensors 120 (as also indicated at example 606) for the waveform 610. If this application of force occurs after a threshold amount of time, the force control module 116 may act to block further processing of the reports and indicate this condition through use of a confidence bit since it is determined that it is not likely that the user intended to initiate an input. Thus, in this example, the position sensors 120 "see" proximity of the object before contact with the outer surface 208 occurs and track this pre-contact proximity. If contact with the outer surface 208 is made after a predefined period of time has passed, the force control module 116 determines that this contact has a low likelihood of being an intentional input.

In one or more implementations, detection of proximity and the amount of force by reports from the force sensors 118 and the position sensors 120 are correlated to distinguish which objects have applied force, an amount of time each object hovers, and so on. For example, the position sensors 120 may sense location as well as a relative strength when sensing the object. If that sensing strength exhibits an increase that coincides with an increase in force, the force control module 116 may assign that detection of force to that object location. Addition or removal of subsequent objects may also be assigned corresponding forces and in this way the force control module 116 may track forces and locations of multiple objects simultaneously to support multiple simultaneous inputs, differentiate amounts of force between objects and corresponding inputs, and so forth.

Additionally, techniques are contemplated in which force is recognized even on a hovering contact, e.g., a level where the force is large enough to be intentional and override and inadvertent lockout. This is performable in a variety of ways, such as through use of a threshold corresponding to a desired amount of force usable to override the lockout.

Figure 7:
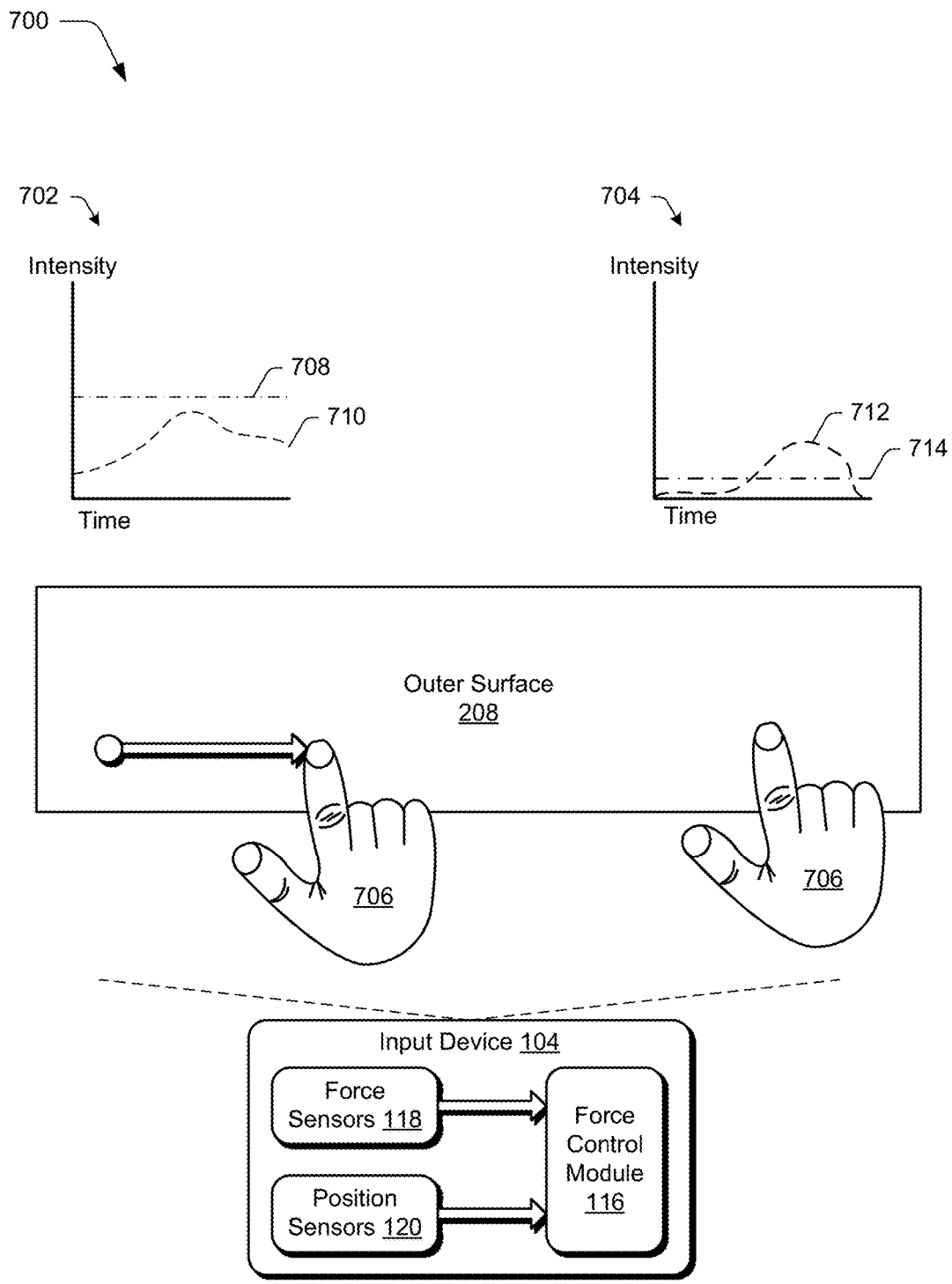
FIG. 7 depicts an example implementation of control of an inadvertent input involving a selection input and movement.

FIG. 7 depicts an example implementation 700 of control of an inadvertent input involving a selection input and subsequent movement as part of a drag operation. This implementation 700 is illustrated using a first example 702 and a second example 704. In conventional mechanical click pads a dome switch is used that mechanically activates whenever an applied force exceeds a fixed threshold. Thus, a moving finger (i.e., a finger performing a drag operation) with sufficient force may still cause an inadvertent button press.

The force control module 116, however, employs force sensing that is usable to control haptic feedback. The force sensing is also usable to determine a likelihood that a user wishes to perform an action, e.g., to initiate a click, to continue or release a drag operation as described in further detail in relation to FIG. 8 below, and so on.

At the first example 702, movement of a finger of a user's hand 706 is illustrated through use of an arrow. The force control module 116 detects movement of the object through the position sensors 120 and utilizes a corresponding threshold 708 to define an amount of force used to initiate the haptic response. Thus, if the force signature 710 remains below this threshold 708 during the movement, the selection input is not initiated, as the force control module 116 has determined that it is unlikely that the user intended to initiate the input.

At the second example 704, however, the force control module 116, through analysis of reports received from the position sensors 120, determines that the object exhibits less than a threshold 708 amount of movement from the first example 702. In response, the force control module 116 uses another threshold 714 to determine likelihood of a user desiring to initiate an input that is lower than the threshold 708 used for movement. Accordingly, if reports of a waveform 712 from a force signature of the force sensors 118 are greater than this threshold 714 (as illustrated), a selection input is initiated, which may include a haptic response (such as a "click" described in relation to FIG. 2). Thus, an inadvertent selection is made less likely yet sensitivity is still preserved through use of an additional threshold 714.

Figure 8:
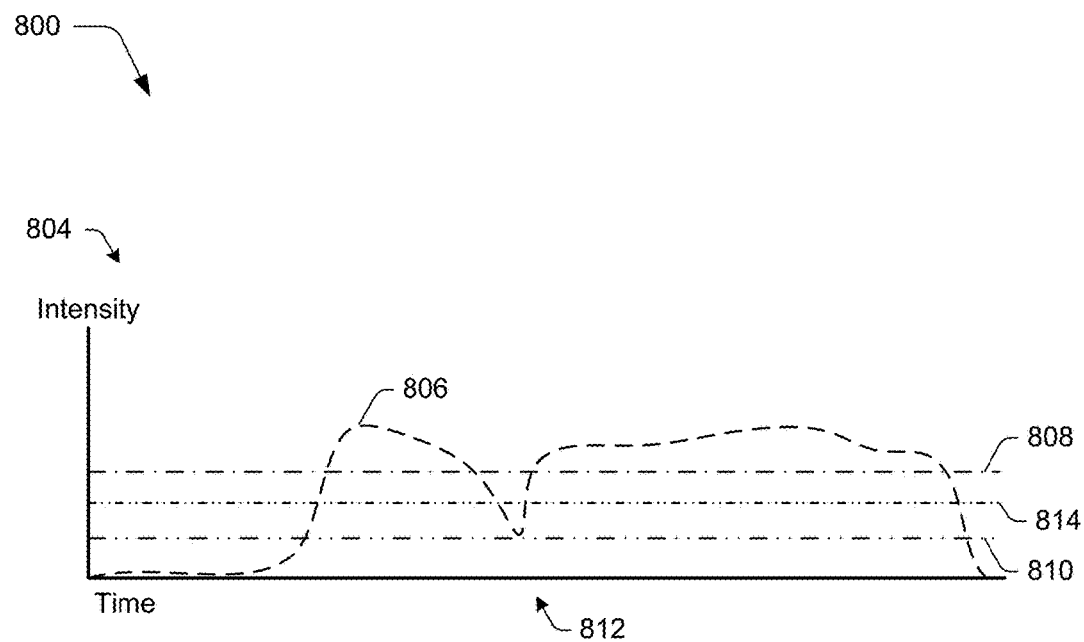
FIG. 8 depicts an example implementation of control of an inadvertent input involving release of a selection input and movement.
Figure 8:
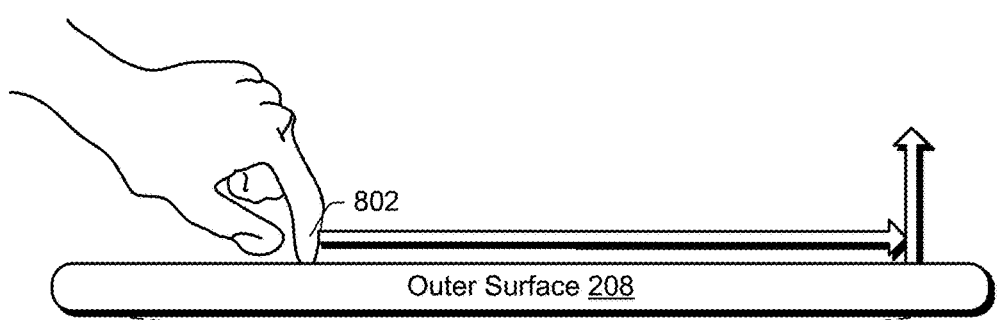
Figure 8:
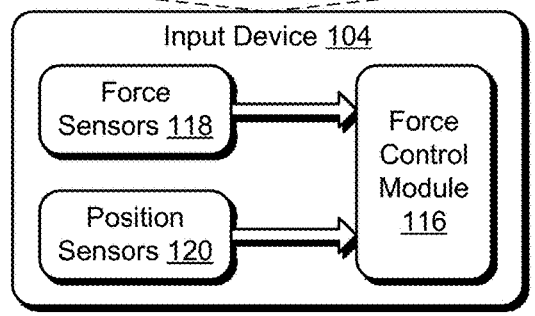

FIG. 8 depicts an example implementation 800 of control of an inadvertent input involving release of a selection input and movement. As described above, in conventional mechanical click pads a dome switch is used that mechanically activates whenever an applied force exceeds a fixed threshold. The conventional click pad is also configured to release whenever an applied force is reduced below a threshold amount, e.g., a return force of the dome switch. Thus, if a user does not maintain enough force during a drag operation of conventional devices, the operation may end before the user intended.

In this example, the force control module 116 is configured to release a haptic response (e.g., a click) for a drag operation if the object applies an amount of force below a threshold 808 and is not moving, i.e., generally stationary. Similarly, the threshold 808 used to define a release may be decreased to threshold 810 during movement in the drag operation to make inadvertent release less likely.

In the illustration of FIG. 8, a finger of a user's hand 802 is illustrated as performing a select and drag operation, movement involved in which is illustrated using arrows along with a graph 804 having a force signature 806 formed as a waveform from reports obtained from the force sensors 118 by the force control module 116. A first threshold 808 is used to determine whether the reports qualify as a selection input as described above, e.g., the "click down."

A drag operation is then performed which involves movement along the outer surface 208 as illustrated by the arrow. During this movement, a second threshold 810 that is lower than the first threshold 808 is used to determine whether the drag operation is to be released or is considered as continuing on. A third threshold 814 is also used as a release threshold, but is used for zero movement and is thus higher than the second threshold 810. Therefore, even though a point 812 may be encountered in which the amount of force drops below the third threshold 814, as long as the force remains above the second threshold 810 and the movement continues, the drag operation also continues. Once the detected force moves below the second threshold 810, termination of the drag operation is indicated, which may be used by the force control module 116 to provide haptic feedback as described in relation to FIG. 2. In this way, an inadvertent click release is made less likely. A variety of other examples are also contemplated without departing from the spirit and scope of the techniques described herein.

Force Inputs and Cursor Control

Figure 9:
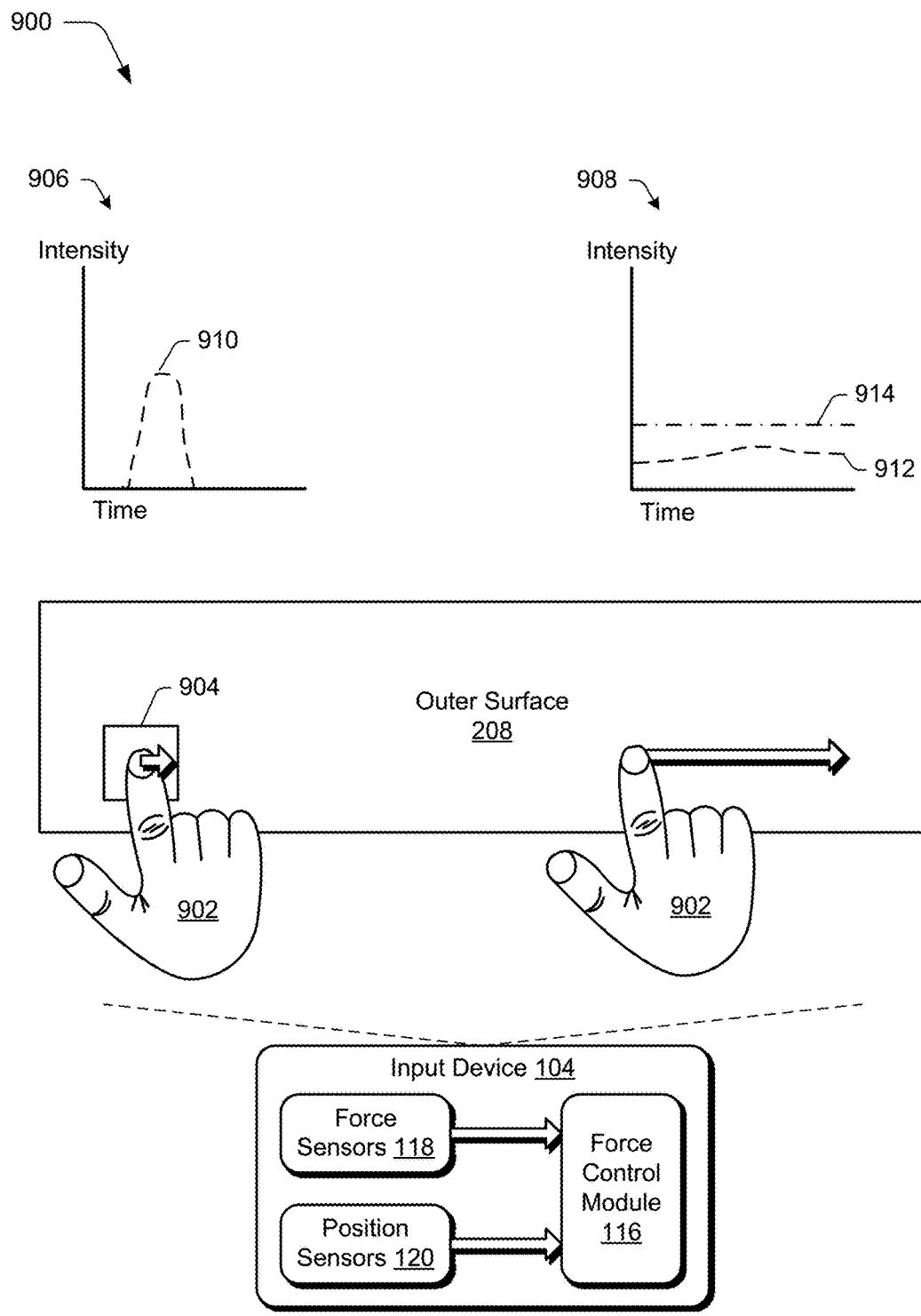
FIG. 9 depicts a system in an example implementation showing techniques usable to control a cursor during press down using force by a force control module.

FIG. 9 depicts a system 900 in an example implementation showing techniques usable to control a cursor during push down using force by a force control module 116. When a user pushes down on a trackpad or touchscreen to select an icon, check a box, or so on a cursor may move in conventional scenarios. This effect may be caused by rolling of a fingertip on an outer surface, deformation of the pulp of a fingertip caused by the force (resulting in a shift in a calculated centroid of the contact), and so forth. To address this, techniques may be utilized to hold what is reported as a relative location of an object (e.g., a finger of a user's hand 902) steady when first contacting the outer surface 208 and report movement when a threshold amount of movement is detected, e.g., as defined by a bounding box 904. These techniques may result in decreased responsiveness.

In this implementation, the force control module 116 employs force to control a cursor in place of or in addition to using the bounding box 904 (e.g., to reduce a size of the bounding box 904 and thus decrease the threshold amount of movement detected before movement is reported). The system 900 includes first example 906 and a second example 908.

At the first example 906, a waveform 910 of a force signature is illustrated from reports of the force sensors 118. The waveform 910 in this example includes sufficient slope (as described in relation to FIG. 3) such that the reports are considered indicative of an input, e.g., a selection input as described above. In response to the force illustrated in the waveform 910, the force control module 116 is configured to override small movement reports communicated by the position sensors 120 that may be caused by deformation, rocking, and so on. As such, a cursor remains stationary while an intentional input is detected in the first example 906.

At the second example 908, a finger of a user's hand 902 is moved across the outer surface 208 as illustrated by an arrow. A corresponding waveform 912 formed by reports obtained from the force sensors 118 illustrates an amount of force at various points in time during this movement. A threshold 914 is used in this example such that if the amount of force remains below the threshold 914, movement of the cursor is permitted. Thus, if the force stays light, then a cursor is allowed to move without delay in the second example 908. However, if the force ramps-up rapidly (as illustrated by the slope of the waveform 910 of the first example 906), the force control module 116 determines that the user likely wishes to initiate an input. In this way, the force control module 116 supports increased responsiveness along with protection against inadvertent inputs. Similar techniques are also usable in regard to removal of contact (e.g., lift off), further discussion of which is included in the following and shown in a corresponding figure.

Figure 10:
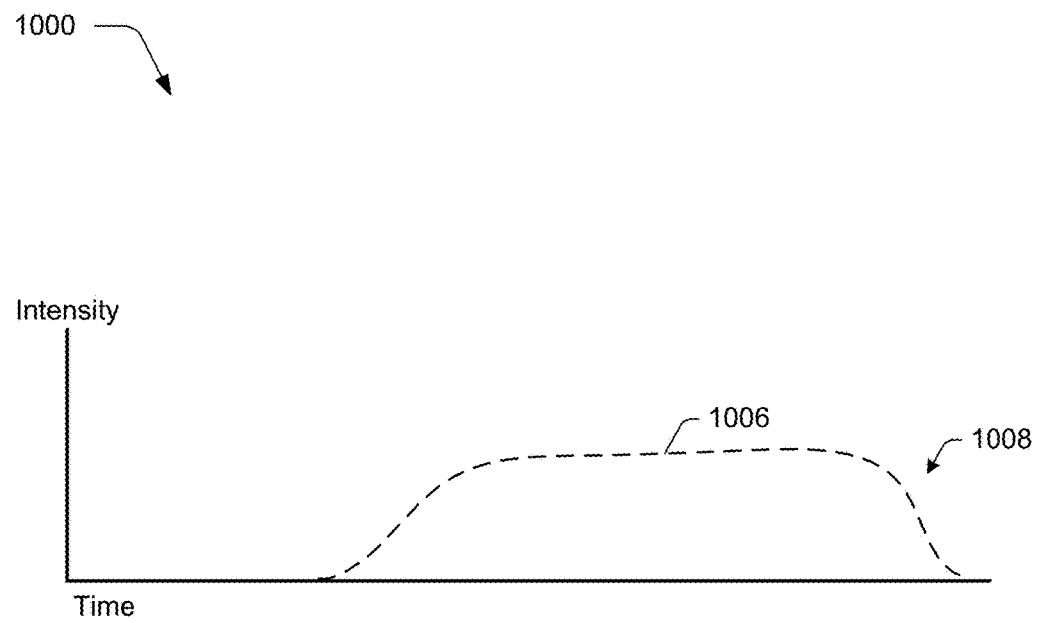
FIG. 10 depicts a system in an example implementation showing techniques usable to control a cursor during lift off using force measurements by a force control module.
Figure 10:
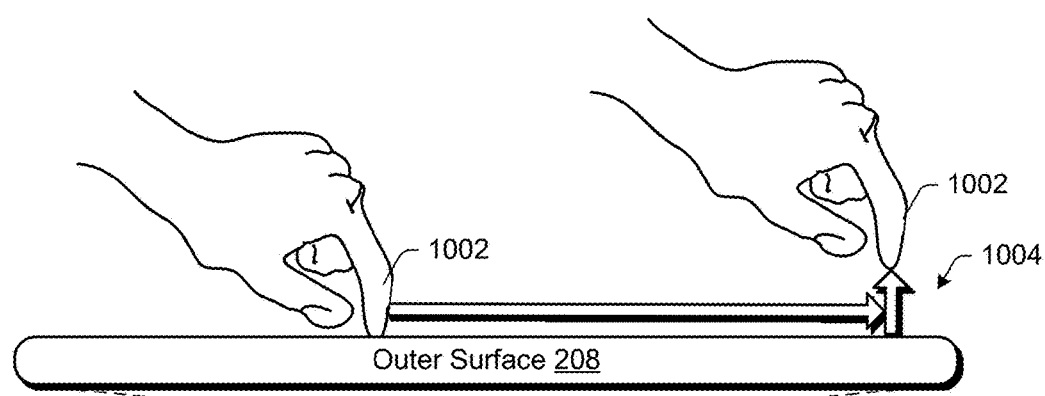
Figure 10:
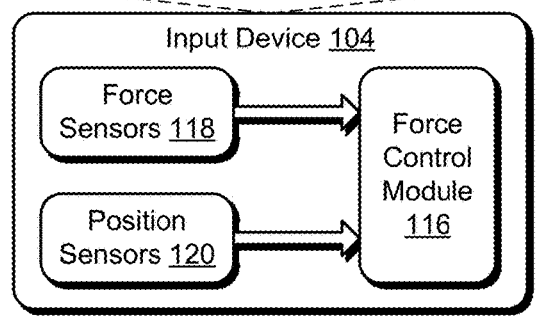

FIG. 10 depicts a system 1000 in an example implementation showing techniques usable to control a cursor during lift off using force measurements by a force control module 116. In the above example of FIG. 9, movement of a cursor that could occur in conventional instances in a press down due to rolling of a fingertip on an outer surface, deformation of pulp of a fingertip caused by the force and thus resulting in a shift in a calculated centroid of the contact, and so forth is described. A similar effect may also be observed on lift off when a finger of a user's hand 1002 is removed from contacting the outer surface 208 and thus in conventional devices could also cause inadvertent movement of a cursor.

Thus, in this example the force control module 116 is also configured to control cursor movement based on force measurements, but in this instance to use reducing force to halt contact movement on lifts. In the illustrated example, a finger of a user's hand 1002 is illustrated as performing a drag operation, which is then terminated by lifting 1004 the finger of the user's hand 1002 away from the outer surface 208 as illustrated using arrows. A waveform 1006 formed by reports obtained from the force sensors 118 indicating an amount of force over time is shown graphically.

When the finger of the user's hand 1002 is lifted 1004 from the outer surface 208, the force control module 116 detects a rapid decrease 1008 in force in the waveform 1006, e.g., a slope over a defined amount. In response, the force control module 116 determines that a user is likely terminating the drag operation and overrides any movement associated with this rapid decrease 1008 that is detected by the position sensors 120. In this way, the cursor is controlled to be relatively stationary upon lift off by using reducing force identified through slope as described above through time and corresponding intensity thresholds to halt recognized contact movement.

Figure 11:
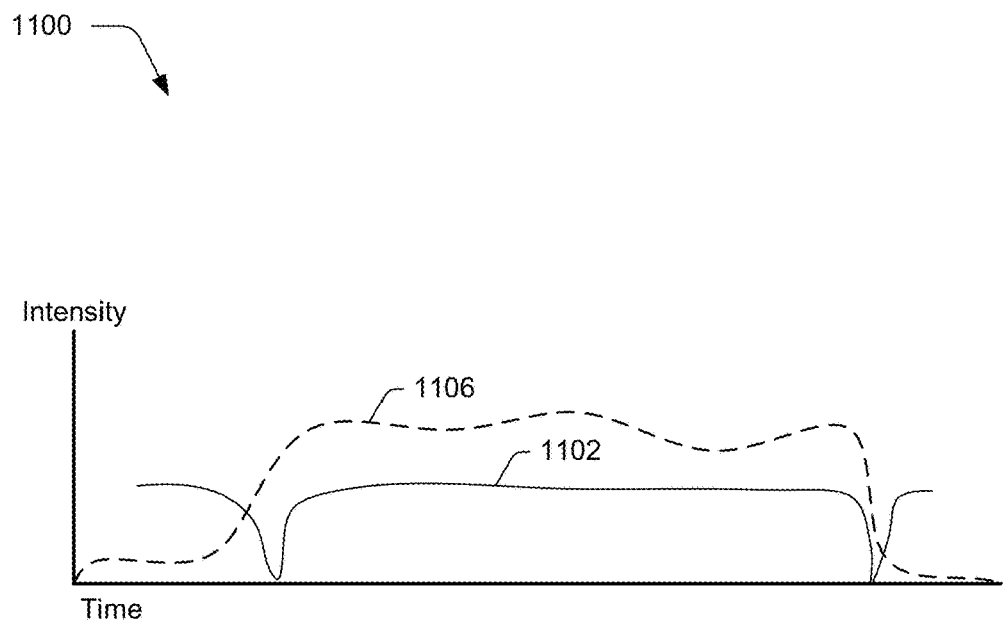
FIG. 11 depicts a system in an example implementation showing techniques usable to control a cursor using measured forces by a force control module to control a gain factor that maps the velocity of an object to the velocity of an on-screen cursor.
Figure 11:
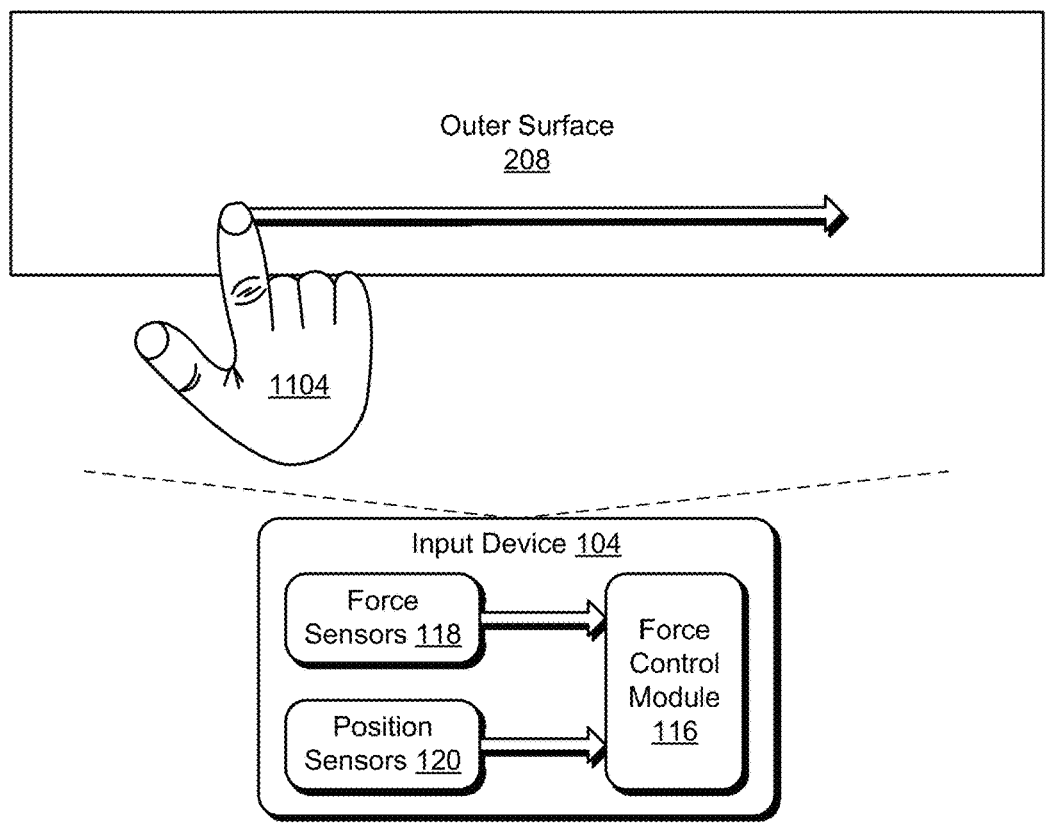

FIG. 11 depicts a system 1100 in an example implementation showing techniques usable to control a cursor using measured forces by a force control module 116 to control a gain factor that maps the velocity of an object to the velocity of an on-screen cursor. Like above, a centroid detected for a location of an object by the position sensors 120 shifts both when a finger is pressed and released. In typical cursor control scenarios, press and release events are performed with a stationary finger of a user's hand.

In this example, a gain factor 1002 maps the physical velocity of movement of an object that is detected by the position sensors 120 to onscreen velocity of a cursor. For example, a finger of the user's hand 1104 may move a half an inch per second and a gain factor 1002 may be used to multiply that movement velocity by a specified amount, which may be dynamically defined, to obtain the onscreen velocity of a cursor.

In the illustrated example, the gain factor 1102 is based at least in part on a rate of variation in an amount of force as detected by the force sensors 118, which is exhibited graphically by a waveform 1106. The gain factor 1102 is attenuated in proportion (e.g., directly, indirectly, dynamically) to an absolute rate of force variation as detected by the force sensors 118. Thus, the gain factor 1102 dips to low values when the waveform 1106 increases or decreases quickly, and remains stable at a nominal level when the waveform 1106 oscillates slowly. The effect is that movement of a cursor is significantly reduced and even eliminated if force applied by an object changes more than a threshold amount. In this way, increased cursor stability is achieved by the force control module 116 while still preserving responsiveness of cursor movement.

Force Curves and Inadvertent Input Control

FIG. 12 depicts a system 1200 in an example implementation usable to employ techniques regarding force curves and inadvertent input control. Conventional multi touch sensors may exhibit a variety of nonlinear behaviors that are compensated for to provide a good user experience. For example, mutual capacitance sensors work because grounded fingers disrupt fringing electrical fields. The intensity of these fields, known as electric flux density, rolls off non-linearly with distance and is dependent on electrode geometry. Additionally, sensors may have edges where uniformity assumptions break down. For example, a finger touching the middle of the touch pad is generally detected by multiple nodes, while a finger located over an edge or corner is often detected by a single node. This again produces errors and introduces biases for all measured quantities.

In the following a device model is described that is usable to infer an amount of force sensed that may be used to perform the previously described techniques without use of a dedicated force sensor 118. Rather, functionality of the force sensor 118 may be realized by the position sensor 120. The force control module 116, for instance, may convert raw sensor values into absolute force units such as grams-force (gf); produce force estimates that are independent of contact size (e.g., finger area); use automatic gain control to adapt to a wide variety of environmental and electrical changes; and correct the effects of spatial aliasing and edge effects.

Accordingly, the force control module 116 incorporates techniques to estimate a size (e.g., area, width and height, major and minor axes) and signal strength (e.g., amplitude, average value, root-mean-square value) for each contact that is used to infer an amount of force applied to the outer surface 208. Signal strength, and thus amplitude, is a quantity that changes with an amount of force, even if in a non-linear manner, and multiple contacts produce independent estimates of size and amplitude.

An example of an input device 104 that incorporates these techniques is illustrated in FIG. 12. The input device 104 is implemented as a multi-touch resistive design with a rectangular grid 1202 of force-sensitive resistive (FSR) nodes illustrated as squares in the figure (arrayed with, for example, a 5 mm pitch). Combinations of the nodes are usable to define keys, trackpad functionality, and so on, an example of which is shown for the letter "A" 1204 that includes four nodes 1206, 1208, 1210, 1212. As an example, gestures may be supported across keys of the keyboard through combinations of nodes. The amplitude reported by each node is proportional to its conductance.

Other examples include a mutual capacitance sensor, with a layer of open-cell foam laminated over the capacitive electrodes. Under a zero-force contact, the foam is relaxed and acts as a spacer with known thickness and dielectric constant. Under force, the foam is compressed, such that the gap between the finger and the sensor electrodes reduces and the foam dielectric constant increases. This produces a measurable and repeatable change in capacitance, which can be used to estimate force. For this sensor, the amplitude reported by each node is proportional to the change in mutual capacitance with respect to its baseline value.

The force control module 116 is used to estimate a centroid, amplitude and area of contact, e.g., through use of a touch controller. These values are generally computed from a matrix of resistance or capacitance deltas, where each element of the matrix corresponds to a sensor node. Amplitude is proportional to peak deltas for a region receiving the application of force. In the illustrated example of FIG. 12, area is proportional to the number of nodes under a contact made by an object.

In the following, a model is first extracted using data obtained from a set of standardized test fingers with diameters covering a range of human finger sizes. For example, if 5.0-15.0 millimeter contact sizes are of interest, a set of fingers with 2.5, 5.0, 7.5, 10.0, 15.0 and 20.0 millimeter diameters can provide sufficient granularity and some margin. Depending on the application, rigid fingers with flat bottoms or flexible fingers may be used. For capacitive systems, the finger is grounded and either made of conductive material or wrapped in a conductive fabric. A robot is used in this example with an attachment mechanically compatible with the set of fingers, capable of applying arbitrary forces over the measurement range and equipped with a two-dimensional stage capable of moving a device under test.

Figure 13:
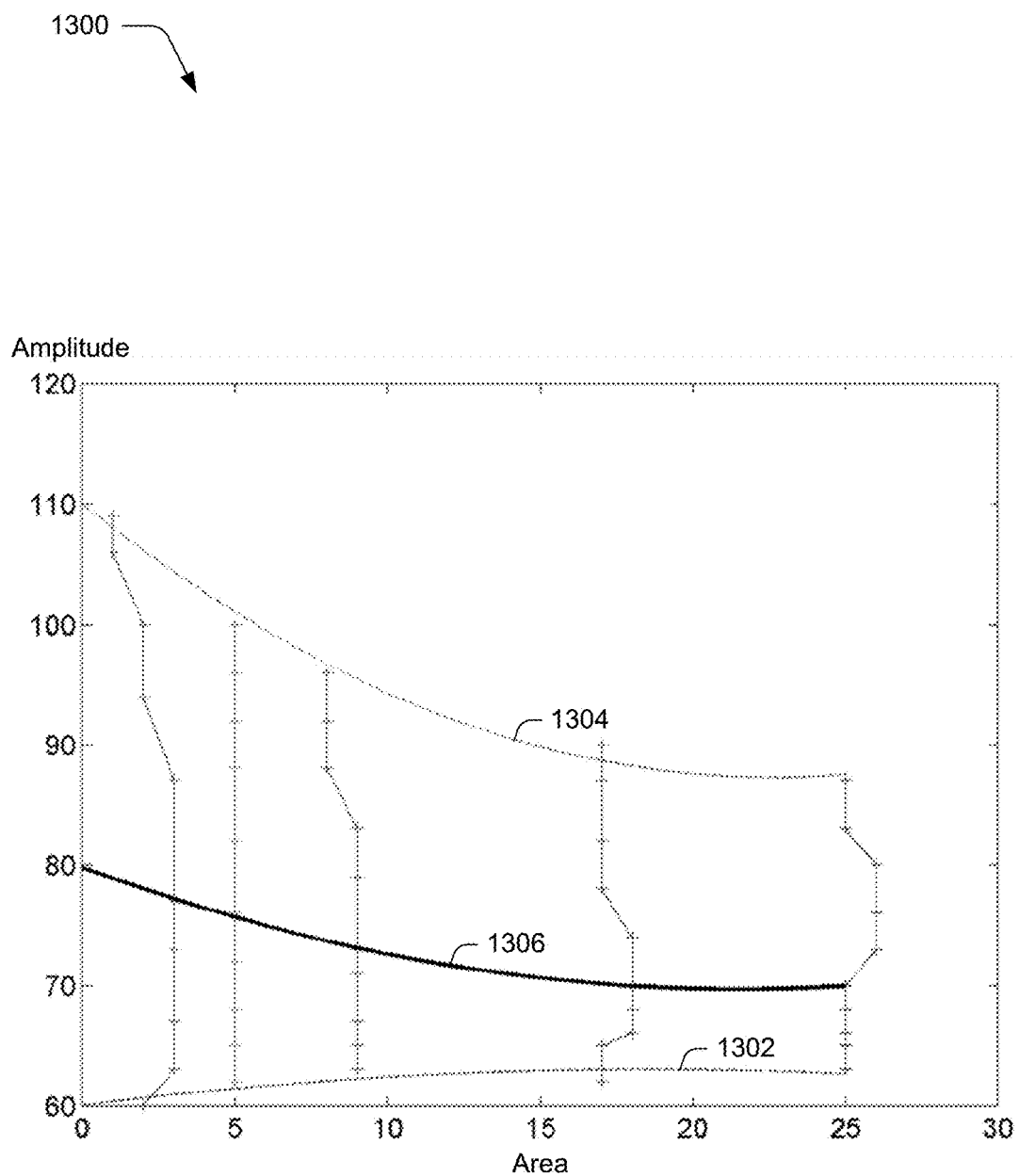
FIG. 13 depicts an example implementation for a real measured operating characteristic, obtained on a manually operated mechanism over a single touch location.

A set of locations receive the robot stimuli, e.g., five locations sufficiently away from the edges. The amount or force (i.e., force values) which are applied to the device under test is varied to span the sensor measurement range. A measurement routine involves moving the robot to the first test location, attaching a first test finger to the robot, and having the robot step through the force values defined above and record centroid, amplitude and area produced by the sensor. This continues for a variety of locations and uses a variety of different finger samples at each location. FIG. 13 depicts an example implementation 1300 for a real, measured operating characteristic, obtained on a manually operated mechanism over a single touch location. Sensor responses are measured at 20, 40, 60, 80, 100, 140, 180, 220, 260 and 300 gf, respectively.

To perform model fitting, for any arbitrary force value v (in grams-force), the sensor's amplitude response is modeled as "$f_v(Area)$," which is a scalar function of its area response. One way of obtaining such a function is by fitting a least-squares polynomial to the measured data, assuming "v" grams-force is part of the force values defined above. It will be recognized that while this example uses contact area to represent contact size, a multi-dimensional quantity may be used instead. For example, contact size may be defined as contact width and height. Alternatively, contact size may be defined as the major and minor axes of the ellipse produced by a least-squares fit. In general, "$f_v(Size)$" is not a curve but an n-manifold that partitions the product space of contact size and signal strength. Curves are used for purposes of illustration and are not intended to be limiting.

The first, second, and third curves 1302, 1304, 1306 of FIG. 13 are un-weighted least-squares second degree polynomials, fit to the responses at 20 gf, 300 gf and 100 gf, respectively. This result leads to the following observations. First, amplitude depends on finger size and may be a non-monotonic function of it. In particular, a naïve algorithm that simply sums the amplitude of all cells produces significant errors. For the force scale of interest and test conditions, the sensor response is located within the first and second curves 1302, 1304. In particular, responses significantly under the first curve 1302 are physically impossible under standard operating conditions. Responses significantly above the second curve 1304 are also impossible due to sensor saturation.

Since this sensor has two output values (i.e., amplitude and area) that are jointly correlated to force, a force threshold corresponds to a curve in the plane defined by the Cartesian product of area and amplitude. For example, the third curve 1306 serves as a threshold for 100 gf with points above the curve exceeding 100 gf, and points below under 100 gf.

Thus, the curves (or in general, n-manifolds) may be used to support a variety of functionality. As a threshold detector, for instance, the curves (or n-manifolds) may be used by the force control module 116 as a basis to determine a likelihood of whether a selection input is initiated or released as described above. In order to do so, a threshold curve (or n-manifold) is created by fitting the dataset to define a desired amount of force. For example, the third curve 1306 is an example threshold function for 100 gf.

Additionally, the first curve 1302 defines a threshold, beneath which responses are physically impossible under standard operating conditions. Accordingly, the first curve 1302 may act as a "zero force" curve in which combinations of signal strength (e.g. amplitude) and contact size (e.g., area) above the first curve 1302 likely involve an application of force and are thus "not hovering." On the other hand, combinations of signal strength (e.g. amplitude) and contact size (e.g., area) below the first curve 1302 are likely hovering.

Thus, on position sensors 120 such as capacitive sensors described earlier, this n-manifold lies in the product space of contact size and signal strength, defined as area and amplitude in the example above. Points formed by combinations above the first curve 1302 are considered to be exerting greater than zero force, and points under this curve are considered to be hovering (not in contact with nor exerting force on the outer surface 208).

The use of a zero-force n-manifold provides better accuracy than simply using separate amplitude or area thresholds, which are the conventional techniques used to determine whether a capacitive contact is valid. Specifically, by ignoring contacts that are under the zero force n-manifold in combination with the techniques described above, the force control module 116 may accurately discriminate and ignore hovering contacts.

The use of n-manifolds in the product space of contact size and signal strength are also usable as part of control of drag operations as described above. For example, users can sometimes inadvertently release a contact during a long drag motion if the characteristics of a contact change during the drag operation, causing the contact down criteria not to be met as described in relation to FIG. 8. This can result in drag operations being interrupted or new tap and drags improperly occurring. Through use of the n-manifolds described herein, however, once a qualified contact is reported and a drag operation commences, communication of reports of contact may be maintained, thereby allowing a reduced criteria n-manifold to apply for termination of contact reporting, i.e., the end of the drag operation. For example, another n-manifold may be employed during movement that defines an amount of force to be detected that is sufficient to maintain the drag operation. The result being that a drag continues uninterrupted until a deliberate lift is encountered as defined by the reduced criteria n-manifold. As described above, force depends on contact size and amplitude. As such, the force control module 116 may be used to fit a parametric surface to a measured dataset and obtain a function mapping an area and amplitude pair into absolute force.

Example Procedures

The following discussion describes inadvertent input force control techniques that may be implemented utilizing the previously described systems and devices. Aspects of each of the procedures may be implemented in hardware, firmware, or software, or a combination thereof. The procedures are shown as a set of blocks that specify operations performed by one or more devices and are not necessarily limited to the orders shown for performing the operations by the respective blocks. In portions of the following discussion, reference will be made to the figures described above.

Functionality, features, and concepts described in relation to the examples of FIGS. 1-13 may be employed in the context of the procedures described herein. Further, functionality, features, and concepts described in relation to different procedures below may be interchanged among the different procedures and are not limited to implementation in the context of an individual procedure. Moreover, blocks associated with different representative procedures and corresponding figures herein may be applied together and/or combined in different ways. Thus, individual functionality, features, and concepts described in relation to different example environments, devices, components, and procedures herein may be used in any suitable combinations and are not limited to the particular combinations represented by the enumerated examples.

Figure 14:
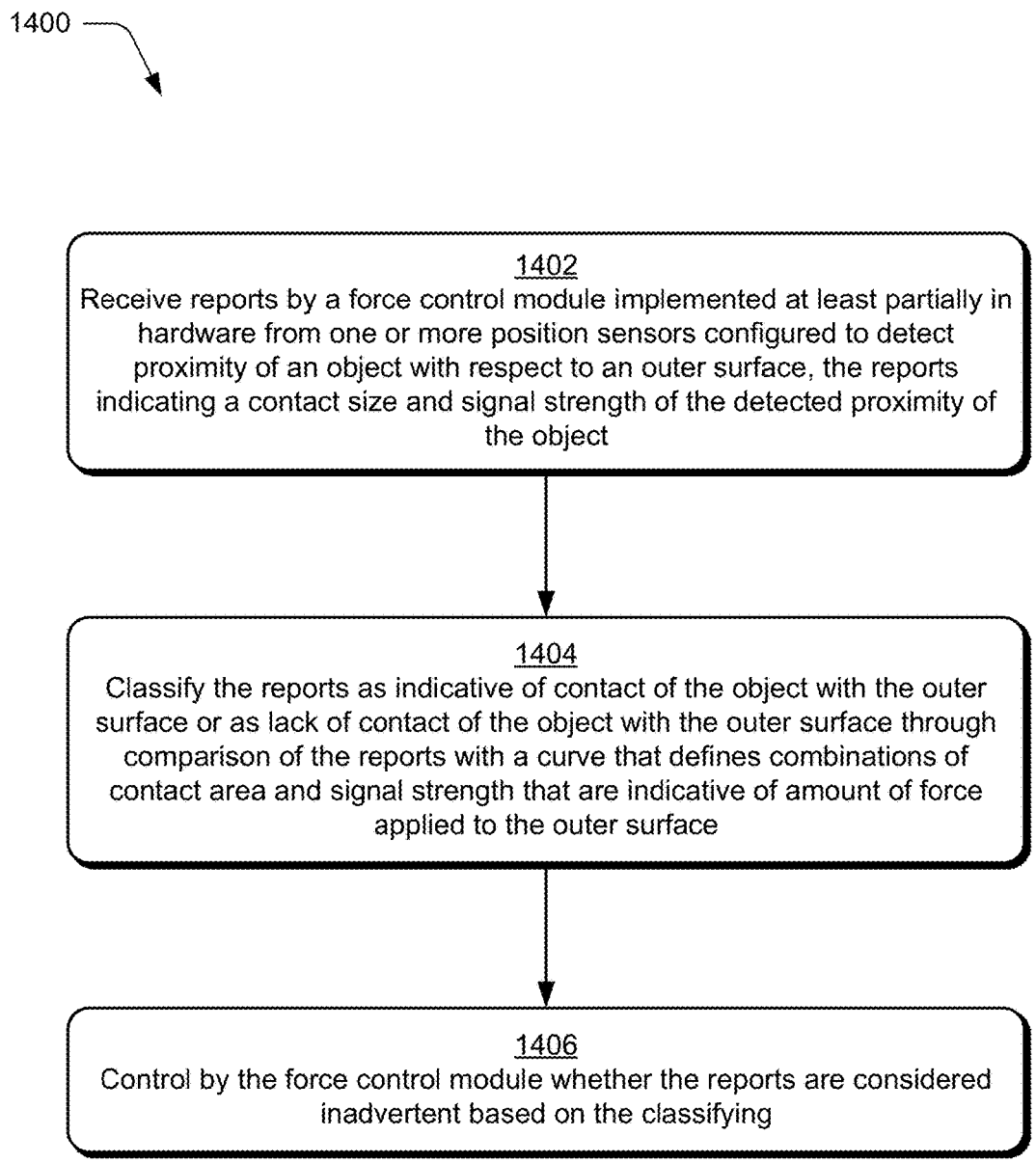
FIG. 14 is a flow diagram depicting a procedure in an example implementation in which curves are used to classify whether or not reports are likely indicative of advertent or inadvertent inputs.

FIG. 14 depicts a procedure 1400 in an example implementation in which n-manifolds are used to classify whether or not reports are likely indicative of advertent or inadvertent inputs. Reports are received by a force control module implemented at least partially in hardware from one or more position sensors configured to detect proximity of an object with respect to an outer surface, the reports indicating a contact size and signal strength of the detected proximity of the object (block 1402). The reports, for instance, may be received by the force control module 116 from position sensors that are configured as capacitive sensors, arrays of nodes as shown in FIG. 12, and so on.

The reports are classified as indicative of contact of the object with the outer surface or as lack of contact of the object with the outer surface through comparison of the reports with an n-manifold that partitions the product space of contact size and signal strength and is indicative of a prescribed force applied to the outer surface (block 1404). The first curve 1302 of FIG. 13, for instance, may define a zero force 1-manifold such that reports having combinations of contact size and signal strength above the curve are considered advertent, and below inadvertent. The force control module controls whether the reports are considered inadvertent based on the classifying (block 1506), such as to block or permit further communication as described above. N-manifolds may be used for a variety of other functionality, such as to define movement in a drag operation, initiation of a selection input, and so on as described in relation to FIGS. 1-13.

Example System and Device

Figure 15:
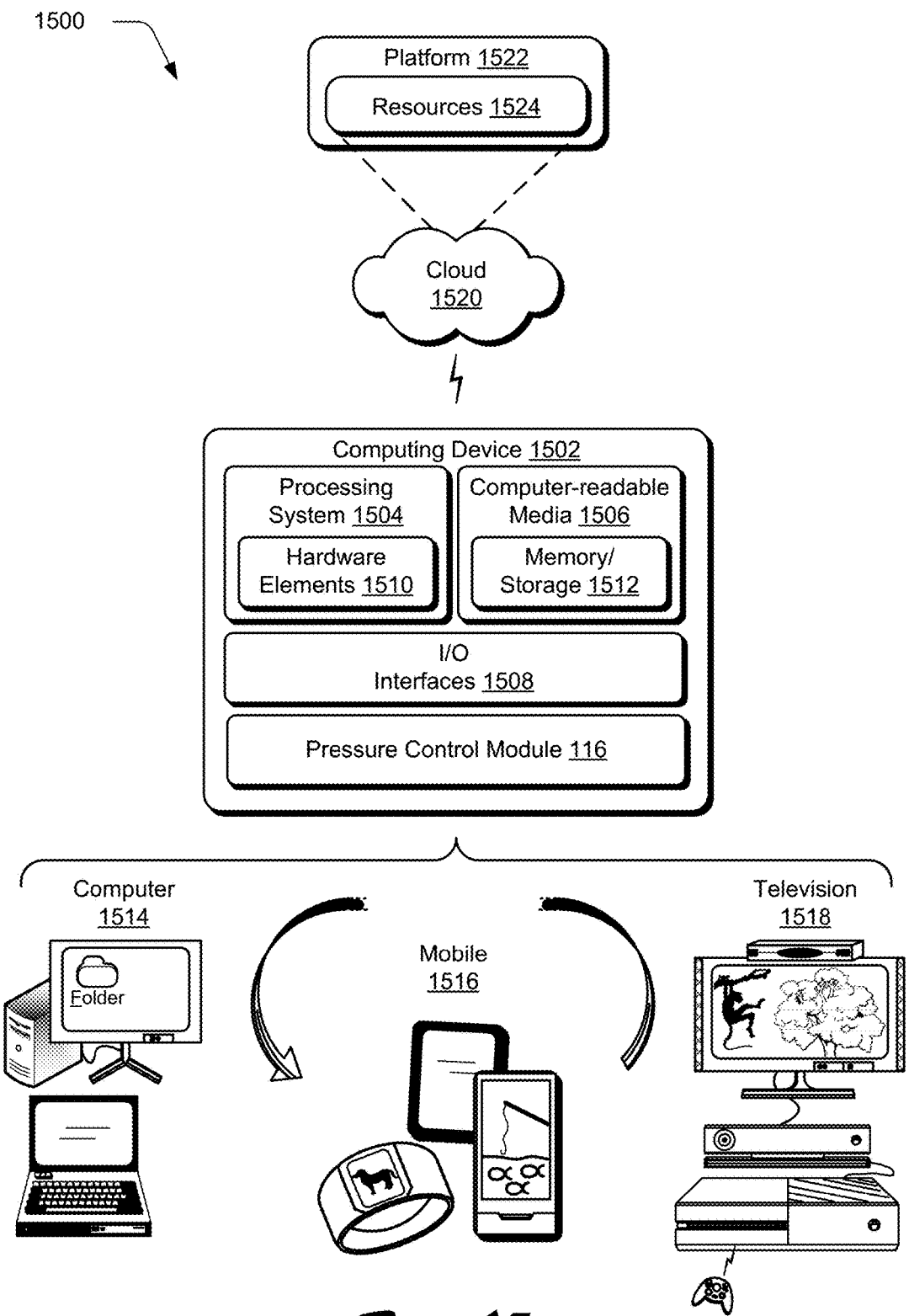
FIG. 15 illustrates an example system including various components of an example device that can be implemented as any type of computing device as described with reference to FIGS. 1-14 to implement embodiments of the techniques described herein.

FIG. 15 illustrates an example system generally at 1500 that includes an example computing device 1602 that is representative of one or more computing systems and/or devices that may implement the various techniques described herein. This is illustrated through inclusion of the force control module 116. The computing device 1602 may be, for example, a server of a service provider, a device associated with a client (e.g., a client device), an on-chip system, and/or any other suitable computing device or computing system.

The example computing device 1502 as illustrated includes a processing system 1504, one or more computer-readable media 1506, and one or more I/O interface 1508 that are communicatively coupled, one to another. Although not shown, the computing device 1502 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1504 is representative of functionality to perform one or more operations using hardware. Accordingly, the processing system 1504 is illustrated as including hardware element 1510 that may be configured as processors, functional blocks, and so forth. This may include implementation in hardware as an application specific integrated circuit or other logic device formed using one or more semiconductors. The hardware elements 1510 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1506 is illustrated as including memory/storage 1512. The memory/storage 1512 represents memory/storage capacity associated with one or more computer-readable media. The memory/storage component 1512 may include volatile media (such as random access memory (RAM)) and/or nonvolatile media (such as read only memory (ROM), Flash memory, optical disks, magnetic disks, and so forth). The memory/storage component 1512 may include fixed media (e.g., RAM, ROM, a fixed hard drive, and so on) as well as removable media (e.g., Flash memory, a removable hard drive, an optical disc, and so forth). The computer-readable media 1506 may be configured in a variety of other ways as further described below.

Input/output interface(s) 1508 are representative of functionality to allow a user to enter commands and information to computing device 1502, and also allow information to be presented to the user and/or other components or devices using various input/output devices. Examples of input devices include a keyboard, a cursor control device (e.g., a trackpad), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1502 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular abstract data types. The terms "module," "functionality," and "component" as used herein generally represent software, firmware, hardware, or a combination thereof. The features of the techniques described herein are platform-independent, meaning that the techniques may be implemented on a variety of commercial computing platforms having a variety of processors.

An implementation of the described modules and techniques may be stored on or transmitted across some form of computer-readable media. The computer-readable media may include a variety of media that may be accessed by the computing device 1502. By way of example, and not limitation, computer-readable media may include "computer-readable storage media" and "computer-readable signal media."

"Computer-readable storage media" may refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and non-volatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1502, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, hardware elements 1510 and computer-readable media 1506 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by one or more hardware elements 1510. The computing device 1502 may be configured to implement particular instructions and/or functions corresponding to the software and/or hardware modules. Accordingly, implementation of a module that is executable by the computing device 1502 as software may be achieved at least partially in hardware, e.g., through use of computer-readable storage media and/or hardware elements 1510 of the processing system 1504. The instructions and/or functions may be executable/operable by one or more articles of manufacture (for example, one or more computing devices 1502 and/or processing systems 1504) to implement techniques, modules, and examples described herein.

As further illustrated in FIG. 15, the example system 1500 enables ubiquitous environments for a seamless user experience when running applications on a personal computer (PC), a television device, and/or a mobile device. Services and applications run substantially similar in all three environments for a common user experience when transitioning from one device to the next while utilizing an application, playing a video game, watching a video, and so on.

In the example system 1500, multiple devices are interconnected through a central computing device. The central computing device may be local to the multiple devices or may be located remotely from the multiple devices. In one embodiment, the central computing device may be a cloud of one or more server computers that are connected to the multiple devices through a network, the Internet, or other data communication link.

In one embodiment, this interconnection architecture enables functionality to be delivered across multiple devices to provide a common and seamless experience to a user of the multiple devices. Each of the multiple devices may have different physical requirements and capabilities, and the central computing device uses a platform to enable the delivery of an experience to the device that is both tailored to the device and yet common to all devices. In one embodiment, a class of target devices is created and experiences are tailored to the generic class of devices. A class of devices may be defined by physical features, types of usage, or other common characteristics of the devices.

In various implementations, the computing device 1502 may assume a variety of different configurations, such as for computer 1514, mobile 1515, and television 1518 uses. Each of these configurations includes devices that may have generally different constructs and capabilities, and thus the computing device 1502 may be configured according to one or more of the different device classes. For instance, the computing device 1502 may be implemented as the computer 1514 class of a device that includes a personal computer, desktop computer, a multi-screen computer, laptop computer, netbook, and so on.

The computing device 1502 may also be implemented as the mobile 1515 class of device that includes mobile devices, such as a mobile phone, wearables (e.g., wrist bands, pendants, rings) portable music player, portable gaming device, a tablet computer, a multi-screen computer, and so on. The computing device 1502 may also be implemented as the television 1518 class of device that includes devices having or connected to generally larger screens in casual viewing environments. These devices include televisions, set-top boxes, gaming consoles, and so on. Other devices are also contemplated, such as appliances, thermostats and so on as part of the "Internet of Things."

The techniques described herein may be supported by these various configurations of the computing device 1502 and are not limited to the specific examples of the techniques described herein. This functionality may also be implemented all or in part through use of a distributed system, such as over a "cloud" 1520 via a platform 1522 as described below.

The cloud 1520 includes and/or is representative of a platform 1522 for resources 1524. The platform 1522 abstracts underlying functionality of hardware (e.g., servers) and software resources of the cloud 1520. The resources 1524 may include applications and/or data that can be utilized while computer processing is executed on servers that are remote from the computing device 1502. Resources 1524 can also include services provided over the Internet and/or through a subscriber network, such as a cellular or Wi-Fi network.

The platform 1522 may abstract resources and functions to connect the computing device 1502 with other computing devices. The platform 1522 may also serve to abstract scaling of resources to provide a corresponding level of scale to encountered demand for the resources 1524 that are implemented via the platform 1522. Accordingly, in an interconnected device embodiment, implementation of functionality described herein may be distributed throughout the system 1500. For example, the functionality may be implemented in part on the computing device 1502 as well as via the platform 1522 that abstracts the functionality of the cloud 1520.

Conclusion and Example Implementations

Example implementations described herein include, but are not limited to, one or any combinations of one or more of the following examples:

An example as described alone or in combination with any of the other examples described above or below of a system comprising: at least one force sensor configured to detect an amount of force applied by an object to an outer surface; one or more position sensors configured to detect movement of the object with respect to the outer surface; and a force control module implemented at least partially in hardware, the force control module configured to control a cursor such that the cursor is held stationary relative to movement of the object responsive to a determination that a change in the amount of force applied by the object to the outer surface is above a predefined threshold.

An example as described alone or in combination with any of the other examples described above or below, wherein the change is a rise in force used to initiate a selection input.

An example as described alone or in combination with any of the other examples described above or below, wherein the change is a decrease in force used to terminate a selection input by lifting the object away from the outer surface.

An example as described alone or in combination with any of the other examples described above or below, wherein the force control module is configured to move the cursor in response to movement of the object when the change in the amount of force is below the predefined threshold.

An example as described alone or in combination with any of the other examples described above or below, wherein the predefined threshold is defined as a slope in the amount of force over a period of time.

An example as described alone or in combination with any of the other examples described above or below, wherein the at least one force sensor, the one or more position sensors, and the outer surface are part of a trackpad.

An example as described alone or in combination with any of the other examples described above or below, wherein the at least one force sensor uses a piezo to detect the amount of force.

An example as described alone or in combination with any of the other examples described above or below, wherein the one or more position sensors are capacitive sensors.

An example as described alone or in combination with any of the other examples described above or below of an apparatus including at least one force sensor configured to detect an amount of force applied by an object to an outer surface; one or more position sensors configured to detect movement of the object with respect to the outer surface; and a force control module implemented at least partially in hardware, the force control module configured to control a gain factor that maps a velocity of the movement of the object to a velocity of a cursor displayed in a user interface based at least in part on a rate of variation in the amount of force detected.

An example as described alone or in combination with any of the other examples described above or below, wherein the control of the gain factor causes the cursor to remain generally stationary due to movement detected during a press or release of the object from contacting the outer surface.

An example as described alone or in combination with any of the other examples described above or below, wherein the movement is caused by a shift in a centroid detected for the object by the one or more position sensors caused by the press or release of the object.

An example as described alone or in combination with any of the other examples described above or below, wherein the at least one force sensor uses a piezo to detect the amount of force.

An example as described alone or in combination with any of the other examples described above or below, wherein the one or more position sensors are capacitive sensors.

An example as described alone or in combination with any of the other examples described above or below, of a method of controlling cursor movement using an input device, the method including detecting an amount of force applied by an object to an outer surface of the input device by at least one force sensor; detecting movement of the object with respect to the outer surface of the input device using one or more position sensors; and overriding the detected movement of the object by a force control module that is implemented at least partially in hardware responsive to a determination that a change in the amount of force applied by the object to the outer surface is above a predefined threshold.

An example as described alone or in combination with any of the other examples described above or below, wherein the change is a rise in force used to initiate a selection input.

An example as described alone or in combination with any of the other examples described above or below, wherein the change is a decrease in force used to terminate a selection input by lifting the object away from the outer surface.

An example as described alone or in combination with any of the other examples described above or below, wherein the force control module is configured to register the movement of the object responsive to a determination that the change in the amount of force is below the predefined threshold.

An example as described alone or in combination with any of the other examples described above or below, wherein the predefined threshold is defined as a slope in the amount of force over a period of time.

An example as described alone or in combination with any of the other examples described above or below, wherein the at least one force sensor, the one or more position sensors, and the outer surface are part of a trackpad.

An example as described alone or in combination with any of the other examples described above or below, wherein the at least one force sensor uses a piezo to detect the amount of force.

Although the example implementations have been described in language specific to structural features and/or methodological acts, it is to be understood that the implementations defined in the appended claims is not necessarily limited to the specific features or acts described. Rather, the specific features and acts are disclosed as example forms of implementing the claimed features.

What is claimed is:

1. A system comprising:
   at least one force sensor configured to detect an amount of force applied by an object to an outer surface;
   one or more position sensors configured to detect movement of the object with respect to the outer surface;
   one or more processors; and
   one or more computer-readable storage media having stored thereon instructions that, responsive to execution by the one or more processors, cause the one or more processors to:
   receive, from the at least one force sensor, a force signature that results from contact by the object with the outer surface;
   determine, based on the force signature, that the amount of force applied by the object to the outer surface is above a first predefined force threshold and at or above a second predefined force threshold, the second predefined force threshold being greater than the first predefined force threshold;
   calculate, based on the force signature, an amount of time between the force applied by the object to the outer surface exceeding the first predefined force threshold and the force applied by the object to the outer surface meeting or exceeding the second predefined force threshold; and
   control a cursor such that the cursor is held stationary relative to movement of the object responsive to a determination that the amount of force applied by the object to the outer surface is above the first predefined force threshold and at or above the second predefined force threshold, and that the amount of time is below a predefined time threshold.

2. The system as described in claim 1, wherein the instructions are executable by the one or more processors to determine the amount of force based on a rise in force used to initiate a selection input.

3. The system as described in claim 1, wherein the instructions are executable by the one or more processors to determine the amount of force based on a decrease in force used to terminate a selection input by lifting the object away from the outer surface.

4. The system as described in claim 1, wherein the instructions are further executable by the one or more processors to move the cursor in response to movement of the object when the amount of force is below the first or second predefined force threshold.

5. The system as described in claim 1, wherein the first and second predefined force threshold are defined as a slope in the amount of force over the amount of time.

6. The system as described in claim 1, wherein the at least one force sensor, the one or more position sensors, and the outer surface are part of a trackpad.

7. The system as described in claim 1, wherein the at least one force sensor uses a piezo to detect the amount of force.

8. The system as described in claim 1, wherein the one or more position sensors are capacitive sensors.

9. An apparatus comprising:
at least one force sensor configured to detect an amount of force applied by an object to an outer surface;
one or more position sensors configured to detect movement of the object with respect to the outer surface;
one or more processors; and
one or more computer-readable storage media having stored thereon instructions that, responsive to execution by the one or more processors, cause the one or more processors to:
receive, from the at least one force sensor, a force signature that results from contact by the object with the outer surface;
determine, based on the force signature, that the amount of force detected by the object to the outer surface is above a first predefined force threshold and at or above a second predefined force threshold, the second predefined force threshold being greater than the first predefined force threshold;
calculate, based on the force signature, an amount of time between the force applied by the object to the outer surface exceeding the first predefined force threshold and the force applied by the object to the outer surface meeting or exceeding the second predefined force threshold; and
control a gain factor that maps a velocity of the movement of the object to a velocity of a cursor displayed in a user interface based at least in part on the amount of force applied by the object to the outer surface being above the first predefined force threshold and at or above the second predefined force threshold, and the amount of time being below a predefined time threshold.

10. The apparatus as described in claim 9, wherein the control of the gain factor causes the cursor to remain generally stationary due to movement detected during a press or release of the object from contacting the outer surface.

11. The apparatus as described in claim 10, wherein the movement is caused by a shift in a centroid detected for the object by the one or more position sensors caused by the press or release of the object.

12. The apparatus as described in claim 9, wherein the at least one force sensor uses a piezo to detect the amount of force.

13. The apparatus as described in claim 9, wherein the one or more position sensors are capacitive sensors.

14. A method of controlling cursor movement using an input device, the method comprising:
detecting an amount of force applied by an object to an outer surface of the input device by at least one force sensor;
receiving, from the at least one force sensor, a force signature that results from contact by the object to the outer surface;
determining, based on the force signature, that the amount of force applied by the object to the outer surface is above a first predefined force threshold and at or above a second predefined force threshold, the second predefined force threshold being greater than the first predefined force threshold;
calculating, based on the force signature, an amount of time between the force applied by the object to the outer surface exceeding the first predefined force threshold and the force applied by the object to the outer surface meeting or exceeding the second predefined force threshold;
detecting movement of the object with respect to the outer surface of the input device using one or more position sensors; and
overriding the detected movement of the object responsive to the determination that the amount of force applied by the object to the outer surface is above the first predefined force threshold and at or above the second predefined force threshold, and that the amount of time is below a predefined time threshold.

15. The method as described in claim 14, further comprising determining the amount of force based on a rise in force used to initiate a selection input.

16. The method as described in claim 14, further comprising determining the amount of force based on a decrease in force used to terminate a selection input by lifting the object away from the outer surface.

17. The method as described in claim 14, further comprising registering the movement of the object responsive to a determination that the amount of force is below the first or second predefined force threshold.

18. The method as described in claim 14, wherein the first and second predefined force threshold are defined as a slope in the amount of force over the amount of time.

19. The method as described in claim 14, wherein the at least one force sensor, the one or more position sensors, and the outer surface are part of a trackpad.

20. The method as described in claim 14, wherein the at least one force sensor uses a piezo to detect the amount of force.

* * * * *